(12) United States Patent
Harutyunyan et al.

(10) Patent No.: US 10,572,329 B2
(45) Date of Patent: Feb. 25, 2020

(54) METHODS AND SYSTEMS TO IDENTIFY ANOMALOUS BEHAVING COMPONENTS OF A DISTRIBUTED COMPUTING SYSTEM

(71) Applicant: VMware, Inc., Palo Alto, CA (US)

(72) Inventors: Ashot Nshan Harutyunyan, Yerevan (AM); Nicholas Kushmerick, Seattle, WA (US); Arnak Poghosyan, Yerevan (AM); Naira Movses Grigoryan, Yerevan (AM); Vardan Movsisyan, Yerevan (AM)

(73) Assignee: VMware, Inc., Palo Alto, CA (US)

( * ) Notice: Subject to any disclaimer, the term of this patent is extended or adjusted under 35 U.S.C. 154(b) by 87 days.

(21) Appl. No.: 15/375,386

(22) Filed: Dec. 12, 2016

(65) Prior Publication Data

US 2018/0165142 A1 Jun. 14, 2018

(51) Int. Cl.
*G06F 11/07* (2006.01)

(52) U.S. Cl.
CPC .......... *G06F 11/079* (2013.01); *G06F 11/076* (2013.01); *G06F 11/0709* (2013.01); *G06F 11/0751* (2013.01); *G06F 11/0778* (2013.01)

(58) Field of Classification Search
CPC . G06F 11/0751; G06F 11/0787; G06F 11/079
See application file for complete search history.

(56) References Cited

U.S. PATENT DOCUMENTS

| | | | |
|---|---|---|---|
| 2009/0169020 A1* | 7/2009 | Sakthikumar | G06F 21/57 380/278 |
| 2013/0117676 A1* | 5/2013 | De Pauw | G06F 3/00 715/738 |
| 2016/0171380 A1* | 6/2016 | Kennel | G06N 7/005 706/12 |
| 2016/0277268 A1* | 9/2016 | Brown | H04L 67/10 |
| 2016/0350395 A1* | 12/2016 | Gupta | G06F 17/30737 |
| 2017/0277727 A1* | 9/2017 | Chen | G06F 17/30303 |

* cited by examiner

*Primary Examiner* — Jigar P Patel

(57) ABSTRACT

Methods and system described herein are directed to identifying anomalous behaving components of a distributed computing system. Methods and system collect log messages generated by a set of event log source running in the distributed computing system within an observation time window. Frequencies of various types of event messages generated within the observation time window are determined for each of the log sources. A similarity value is calculated for each pair of event sources. The similarity values are used to identify similar clusters of event sources of the distributed computing system for various management purposes. Components of the distributed computing system that are used to host the event source outliers may be identified as potentially having problems or may be an indication of future problems.

24 Claims, 38 Drawing Sheets

```
log.write([$Time_date] [Thread-$X/$IP/INFO]
[com.vmware.loginsight.commons.executor.ProcessExecutor] [ [[/usr/lib/loginsight/application/
lib/apache-cassandra-2.0.10/bin/nodetool, -h, montools-prod-loginsight.vmware.com, repair]]
[$Time_date] Repair session $RS for range $range finished)
```

FIG. 16

```
[2015-03-10 23:43:36.859+0000] [Thread-1822496/127.0.0.1 INFO]
[com.vmware.loginsight.commons.executor.ProcessExecutor] [ [[/usr/lib/loginsight/application/
lib/apache-cassandra-2.0.10/bin/nodetool, -h, montools-prod-loginsight.vmware.com, repair]]
[2015-03-10 23:43:36,716] Repair session 51312720-c77e-11e4-ad72-4769d614a3f2 for range
(-6899937477723537626, -6896547230076663429) finished]
```

FIG. 17

```
                                                        ← 1802
  ┌  ╱1808    ╱1810                                       ┐
  │  2013-12-02T10:44:24.095Z li-qe-esx5.vmware.com Rhttpproxy:    │ ← 1804
  │  [28959B90 verbose 'Proxy Req 46691'] Connected to             │
  │  localhost:8307 ← 1812                    ↖ 1806               │
  ├────────────────────────────────────────────────────────┤
  │  2013-12-02T10:44:24.094Z li-qe-esx5.vmware.com Rhttpproxy:    │
  │  [FFFC2B90 verbose 'Proxy Req 46691'] new proxy client         │
  │  TCP (local-127.0.0.1:80, peer=127.0.0.1:50155)                │
  ├────────────────────────────────────────────────────────┤
  │  2013-12-02T10:44:24.093Z li-qe-esx5.vmware.com Rhttpproxy:    │
  │  [2889B90 verbose 'Proxy Req 46685'] The client closed the     │
  │  stream, not unexpectedly.                                     │
  ├────────────────────────────────────────────────────────┤
  │  Dec  2 18:48:29 strata-vc 2013-12-02T18:48:30.273Z            │
  │  [7FA39448B700 info 'commonvpxLro' opID=1947d6f9]  [VpxLRO] -  │
  │  FINISH task-internal-2163522 -- -- vim.SessionManager.logout -│
  ├────────────────────────────────────────────────────────┤
  │  2013-12-02T18:48:51.396Z strata-esx1.eng.vmware.com Vpxa:     │
  │  [65B5AB90 verbose 'VpxaHalCnxHostagent' opID=WFU-ed393333]    │
  │  [WaitForUpdatesDone] Completed callback                       │
  ├────────────────────────────────────────────────────────┤
  │  2013-12-02T18:48:51.395Z strata-esx1.eng.vmware.com Vpxa:     │
  │  [65B5AB90 verbose 'VpxaHalCnxHostagent' opID=WFU-ed393333]    │
  │  [WaitForUpdatesDone] Starting next WaitForUpdates() call to   │
  │  hostd                                                         │
  ├────────────────────────────────────────────────────────┤
  │  2013-12-02T18:48:51.395Z strata-esx1.eng.vmware.com Vpxa:     │
  │  [65B5AB90 verbose 'vpxavpxaInvtVm' opID=WFU-ed393333]         │
  │  [VpxaInvtVmChangeListener] Guest DiskInfo Changed             │
  ├────────────────────────────────────────────────────────┤
  │  2013-12-02T18:48:51.395Z strata-esx1.eng.vmware.com Vpxa      │
  │  [65B5AB90 verbose 'vpxavpxaInvtVm' opID=WFU-ed393333]         │
  │  [VpxaInvtVmChangeListener] Guest DiskInfo Changed             │
  └────────────────────────────────────────────────────────┘
```

FIG. 18

|     | $ES_A$ | $ES_B$ | $ES_C$ | $ES_D$ | $ES_E$ | $ES_F$ | $ES_G$ |
|-----|--------|--------|--------|--------|--------|--------|--------|
| $ES_A$ | 1 | .5 | .58  | 0    | .75  | .375 | .625 |
| $ES_B$ |   | 1  | .296 | .166 | .333 | .8   | .223 |
| $ES_C$ |   |    | 1    | 0    | .571 | .333 | .667 |
| $ES_D$ |   |    |      | 1    | 0    | .2   | .143 |
| $ES_E$ |   |    |      |      | 1    | .233 | .625 |
| $ES_F$ |   |    |      |      |      | 1    | .25  |
| $ES_G$ |   |    |      |      |      |      | 1    |

|  | $ES_A$ | $(ES_B, ES_F)$ | $ES_C$ | $ES_D$ | $ES_E$ | $ES_G$ |
|---|---|---|---|---|---|---|
| $ES_A$ | 1 | .5 | .58 | 0 | .75 | .625 |
| $(ES_B, ES_F)$ |  | 1 | .333 | .25 | .333 | .25 |
| $ES_C$ |  |  | 1 | 0 | .571 | .667 |
| $ES_D$ |  |  |  | 1 | 0 | .143 |
| $ES_E$ |  |  |  |  | 1 | .625 |
| $ES_G$ |  |  |  |  |  | 1 |

2702 ← (row $(ES_B, ES_F)$)
2704 (column $(ES_B, ES_F)$)

|  | $(ES_A, ES_E)$ | $(ES_B, ES_F)$ | $(ES_C, ES_G)$ | $ES_D$ |
|---|---|---|---|---|
| $(ES_A, ES_E)$ | 1 | .5 | .625 | 0 |
| $(ES_B, ES_F)$ |  | 1 | .333 | .25 |
| $(ES_C, ES_G)$ |  |  | 1 | .143 |
| $ES_D$ |  |  |  | 1 |

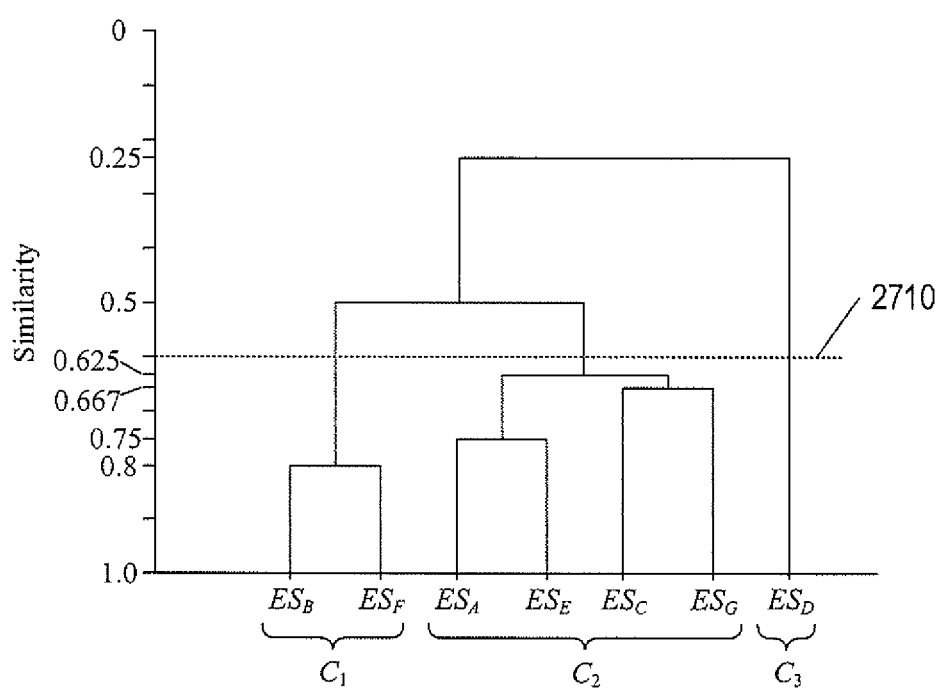

METHODS AND SYSTEMS TO IDENTIFY ANOMALOUS BEHAVING COMPONENTS OF A DISTRIBUTED COMPUTING SYSTEM

TECHNICAL FIELD

The present disclosure is directed to event messages and log files and, in particular, to methods and systems that identify components that exhibit abnormal behavior in a distributed computing system.

BACKGROUND

During the past seven decades, electronic computing has evolved from primitive, vacuum-tube-based computer systems, initially developed during the 1940s, to modern electronic computing systems in which large numbers of multiprocessor server computers, work stations, and other individual computing systems are networked together with large-capacity data-storage devices and other electronic devices to produce geographically distributed computing systems with hundreds of thousands, millions, or more components that provide enormous computational bandwidths and data-storage capacities. These large, distributed computing systems are made possible by advances in computer networking, distributed operating systems and applications, data-storage appliances, computer hardware, and software technologies. Despite all of these advances, however, the rapid increase in the size and complexity of computing systems has been accompanied by numerous scaling issues and technical challenges, including technical challenges associated with communications overheads encountered in parallelizing computational tasks among multiple processors, component failures, and distributed-system management. As new distributed-computing technologies are developed and as general hardware and software technologies continue to advance, the current trend towards ever-larger and more complex distributed computing systems appears likely to continue well into the future.

In modern computing systems, individual computers, subsystems, and components generally output large volumes of status, informational, and error messages that are collectively referred to, in the current document, as "event messages." In large, distributed computing systems, terabytes of event messages may be generated each day. The event messages are often collected into event logs stored as files in data-storage appliances and are often analyzed both in real time, as they are generated and received, as well as retrospectively, after the event messages have been initially processed and stored in event logs. Event logs that are generated by similar event sources over a period of time are expected to be similar. The similar event sources may be copies of the same operating system, application program, virtual machine, or machine code running on a number of different server computers. An event log that is different from the event logs of other event sources may be an indication of a problem or management issues with components of a distributed computer system, such as a server computer used to host an event source. However, because the log files of the event sources may each have many thousands or even millions of event messages generated over the observation time window, determining which event sources are outliers is an enormous task.

SUMMARY

Methods and system described herein are directed to identifying anomalous behaving components of a distributed computing system based on event logs. Event logs generated by a set of event sources running in the distributed computing system within an observation time window are collected. Frequencies of various types of event messages generated within the observation time window are determined for each of the event logs. A similarity value is calculated between each pair of event sources. Clustering analysis may be applied to the similarity values in order to generate clusters of event sources and identify any event source outliers within each cluster. Components of a distributed computing system that are used to host the event source outliers may be identified for various management purposes, including, but not limited to, as having problems, issues, future problems or identified for monitoring or troubleshooting.

DESCRIPTION OF THE DRAWINGS

FIG. 16 shows an example of a log write instruction.

FIG. 17 shows an example of an event message generated by the log write instruction of FIG. 16.

FIG. 18 shows a small, eight-entry portion of an event log.

FIGS. 27A-27L show an example of hierarchical clustering applied to a set of seven event sources using maximum linkage criterion.

DETAILED DESCRIPTION

Figure 1:
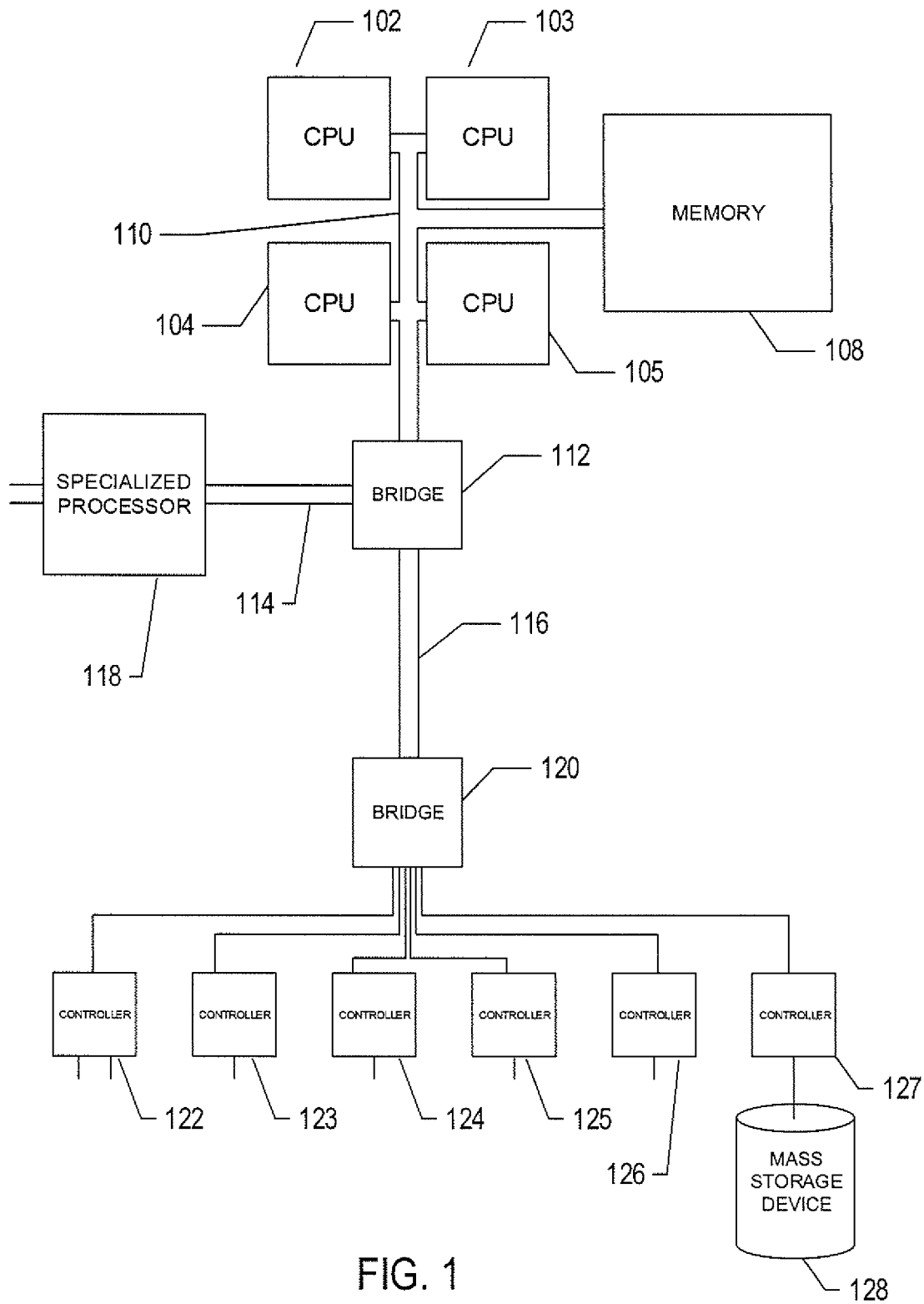
FIG. 1 shows a general architectural diagram for various types of computers.

This disclosure presents computational methods and systems to identify anomalous behaving server computers of a distributed computing system. In a first subsection, computer hardware, complex computational systems, and virtualization are described. Containers and containers supported by virtualization layers are described in a section subsection. Methods and systems to identify anomalous behaving components of a distributed computing system are described below in a third subsection.

Computer Hardware, Complex Computational Systems, and Virtualization

The term "abstraction" is not, in any way, intended to mean or suggest an abstract idea or concept. Computational abstractions are tangible, physical interfaces that are implemented, ultimately, using physical computer hardware, data-storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces. There is a tendency among those unfamiliar with modern technology and science to misinterpret the terms "abstract" and "abstraction," when used to describe certain aspects of modern computing. For example, one frequently encounters assertions that, because a computational system is described in terms of abstractions, functional layers, and interfaces, the computational system is somehow different from a physical machine or device. Such allegations are unfounded. One only needs to disconnect a computer system or group of computer systems from their respective power supplies to appreciate the physical, machine nature of complex computer technologies. One also frequently encounters statements that characterize a computational technology as being "only software," and thus not a machine or device. Software is essentially a sequence of encoded symbols, such as a printout of a computer program or digitally encoded computer instructions sequentially stored in a file on an optical disk or within an electromechanical mass-storage device. Software alone can do nothing. It is only when encoded computer instructions are loaded into an electronic memory within a computer system and executed on a physical processor that so-called "software implemented" functionality is provided. The digitally encoded computer instructions are an essential and physical control component of processor-controlled machines and devices, no less essential and physical than a cam-shaft control system in an internal-combustion engine. Multi-cloud aggregations, cloud-computing services, virtual-machine containers and virtual machines, communications interfaces, and many of the other topics discussed below are tangible, physical components of physical, electro-optical-mechanical computer systems.

FIG. 1 shows a general architectural diagram for various types of computers. Computers that receive, process, and store event messages may be described by the general architectural diagram shown in FIG. 1, for example. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational devices. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval, and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

Figure 2:
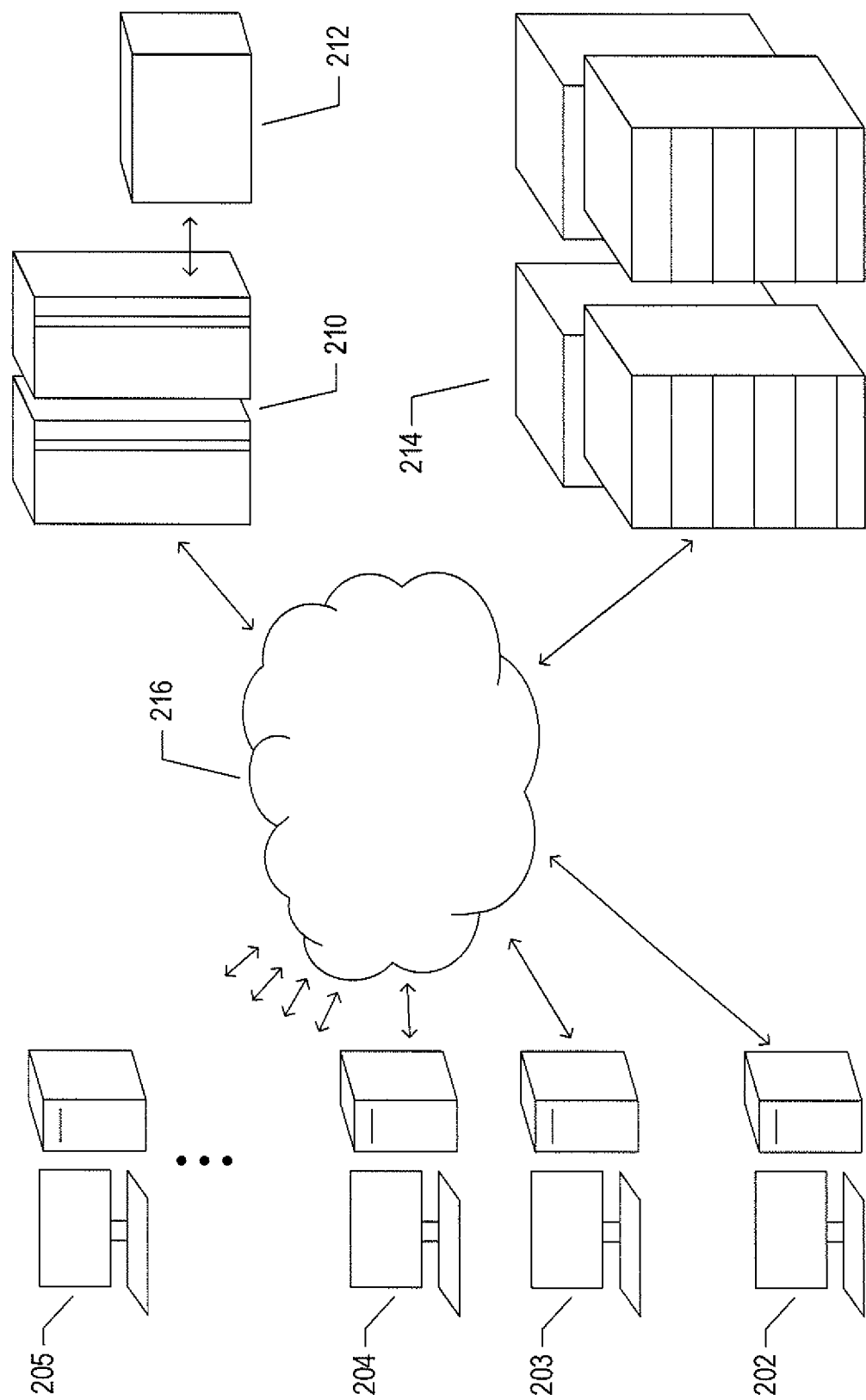
FIG. 2 shows an Internet-connected distributed computer system.

FIG. 2 shows an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted servers or blade servers all interconnected through various communications and networking systems that together comprise the Internet 216. Such distributed computing systems provide diverse arrays of functionalities. For example, a PC user may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web servers, back-end computer systems, and data-storage systems for serving web pages to remote customers, receiving orders through the web-page interface, processing the orders, tracking completed orders, and other myriad different tasks associated with an e-commerce enterprise.

Figure 3:
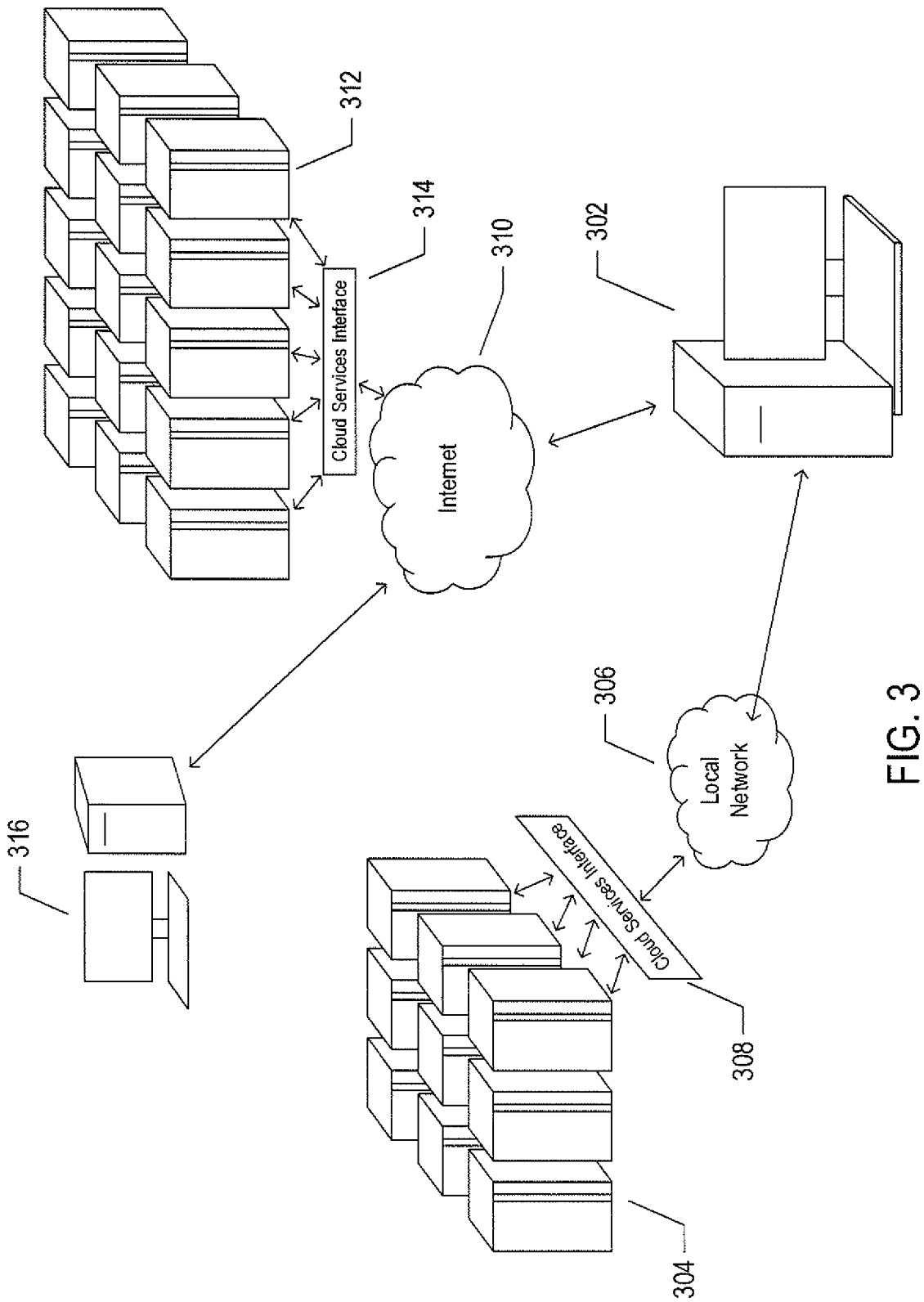
FIG. 3 shows cloud computing.

FIG. 3 shows cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the devices to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
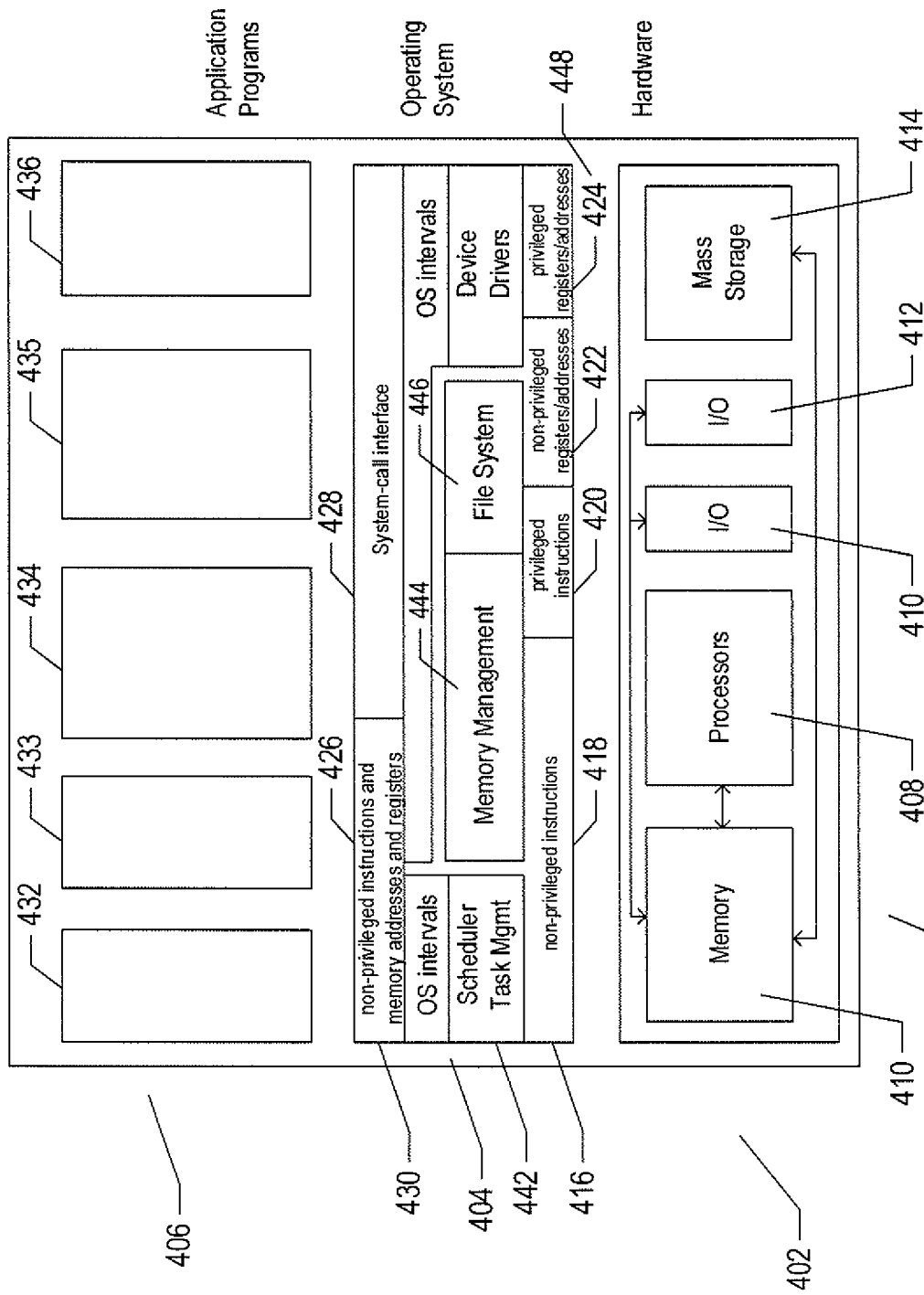
FIG. 4 shows generalized hardware and software components of a general-purpose computer system.

FIG. 4 shows generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor devices and other system devices with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 446 facilitates abstraction of mass-storage-device and memory devices as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems, and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
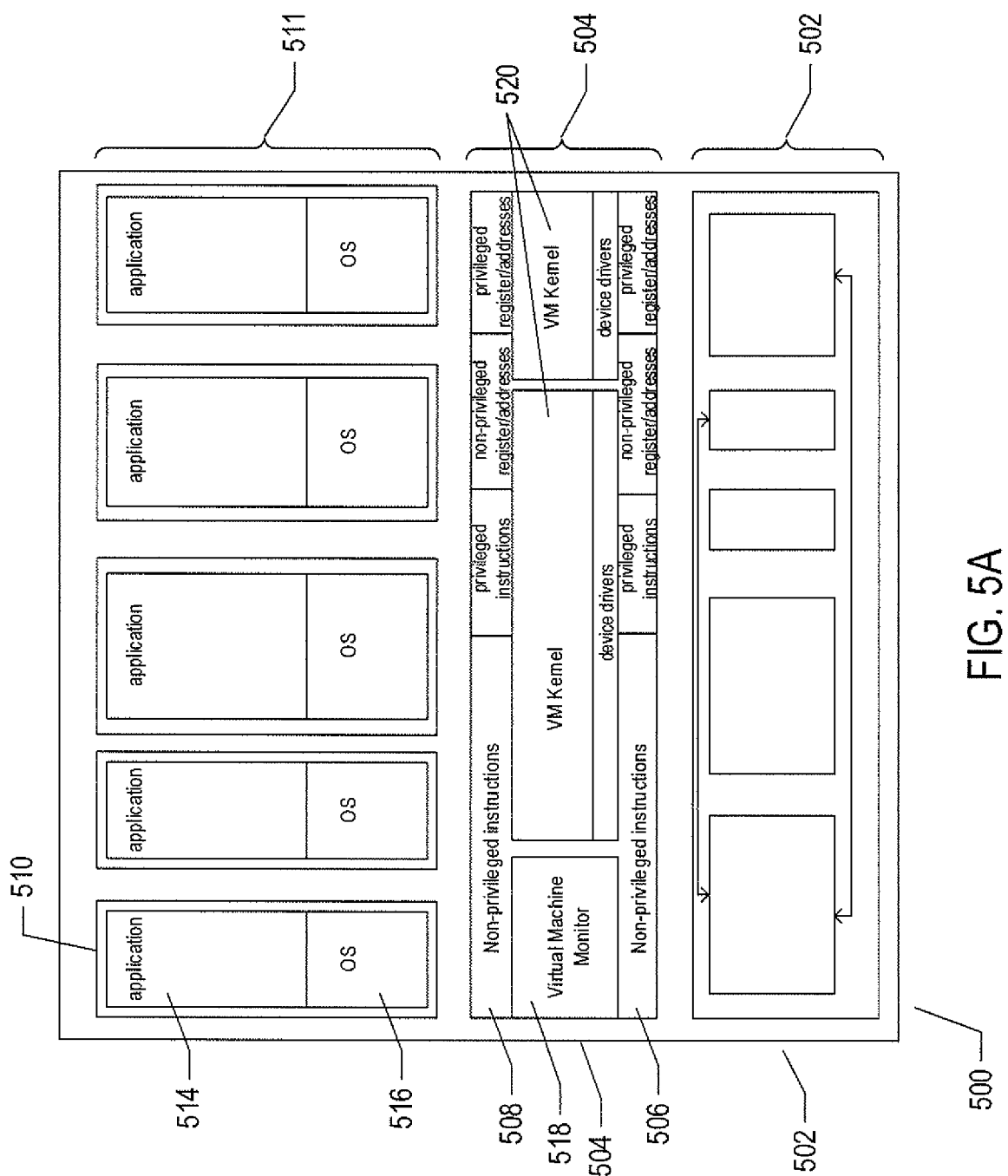
FIGS. 5A-5B show two types of virtual machine and virtual-machine execution environments.
Figure 5B:
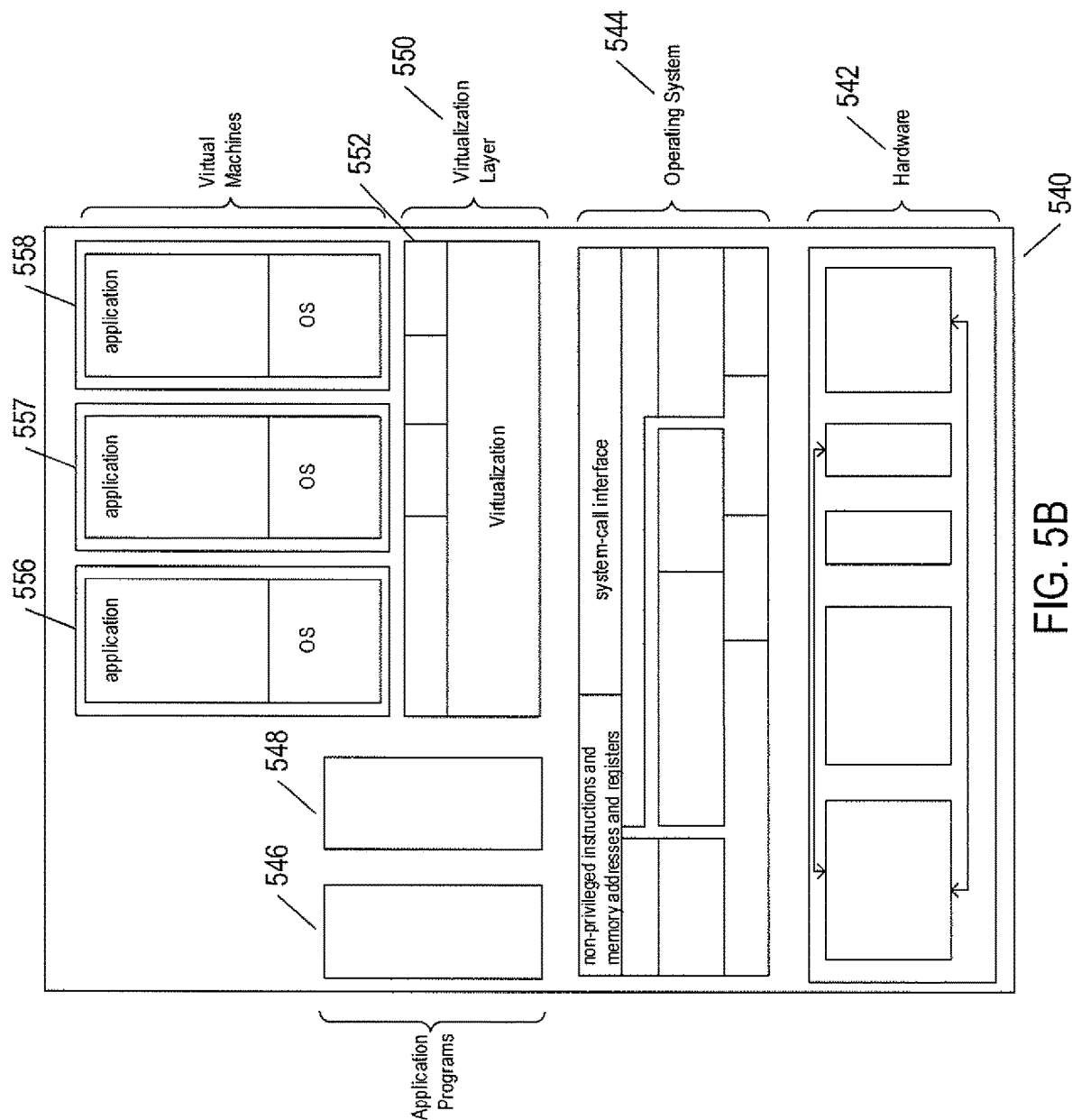

For all of these reasons, a higher level of abstraction, referred to as the "virtual machine," ("VM") has been developed and evolved to further abstract computer hardware in order to address many difficulties and challenges associated with traditional computing systems, including the compatibility issues discussed above. FIGS. 5A-B show two types of VM and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment shown in FIG. 5A features a virtualization layer 504 that interfaces through a virtualization-layer/hardware-layer interface 506, equivalent to interface 416 in FIG. 4, to the hardware. The virtualization layer 504 provides a hardware-like interface to a number of VMs, such as VM 510, in a virtual-machine layer 511 executing above the virtualization layer 504. Each VM includes one or more application programs or other higher-level computational entities packaged together with an operating system, referred to as a "guest operating system," such as application 514 and guest operating system 516 packaged together within VM 510. Each VM is thus equivalent to the operating-system layer 404 and application-program layer 406 in the general-purpose computer system shown in FIG. 4. Each guest operating system within a VM interfaces to the virtualization layer interface 504 rather than to the actual hardware interface 506. The virtualization layer 504 partitions hardware devices into abstract virtual-hardware layers to which each guest operating system within a VM interfaces. The guest operating systems within the VMs, in general, are unaware of the virtualization layer and operate as if they were directly accessing a true hardware interface. The virtualization layer 504 ensures that each of the VMs currently executing within the virtual environment receive a fair allocation of underlying hardware devices and that all VMs receive sufficient devices to progress in execution. The virtualization layer 504 may differ for different guest operating systems. For example, the virtualization layer is generally able to provide virtual hardware interfaces for a variety of different types of computer hardware. This allows, as one example, a VM that includes a guest operating system designed for a particular computer architecture to run on hardware of a different architecture. The number of VMs need not be equal to the number of physical processors or even a multiple of the number of processors.

The virtualization layer 504 includes a virtual-machine-monitor module 518 ("VMM") that virtualizes physical processors in the hardware layer to create virtual processors on which each of the VMs executes. For execution efficiency, the virtualization layer attempts to allow VMs to directly execute non-privileged instructions and to directly access non-privileged registers and memory. However, when the guest operating system within a VM accesses virtual privileged instructions, virtual privileged registers, and virtual privileged memory through the virtualization layer 504, the accesses result in execution of virtualization-layer code to simulate or emulate the privileged devices. The virtualization layer additionally includes a kernel module 520 that manages memory, communications, and data-storage machine devices on behalf of executing VMs ("VM kernel"). The VM kernel, for example, maintains shadow page tables on each VM so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer 504 essentially schedules execution of VMs much like an operating system schedules execution of application programs, so that the VMs each execute within a complete and fully functional virtual hardware layer.

FIG. 5B shows a second type of virtualization. In FIG. 5B, the computer system 540 includes the same hardware layer 542 and operating system layer 544 as the hardware layer 402 and the operating system layer 404 shown in FIG. 4. Several application programs 546 and 548 are shown running in the execution environment provided by the operating system 544. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The hardware-layer interface 552, equivalent to interface 416 in FIG. 4, provides an execution environment for a number of VMs 556-558, each including one or more application programs or other higher-level computational entities packaged together with a guest operating system.

In FIGS. 5A-5B, the layers are somewhat simplified for clarity of illustration. For example, portions of the virtualization layer 550 may reside within the host-operating-system kernel, such as a specialized driver incorporated into the host operating system to facilitate hardware access by the virtualization layer.

It should be noted that virtual hardware layers, virtualization layers, and guest operating systems are all physical entities that are implemented by computer instructions stored in physical data-storage devices, including electronic memories, mass-storage devices, optical disks, magnetic disks, and other such devices. The term "virtual" does not, in any way, imply that virtual hardware layers, virtualization layers, and guest operating systems are abstract or intangible. Virtual hardware layers, virtualization layers, and guest operating systems execute on physical processors of physical computer systems and control operation of the physical computer systems, including operations that alter the physical states of physical devices, including electronic memories and mass-storage devices. They are as physical and tangible as any other component of a computer since, such as power supplies, controllers, processors, busses, and data-storage devices.

Figure 6:
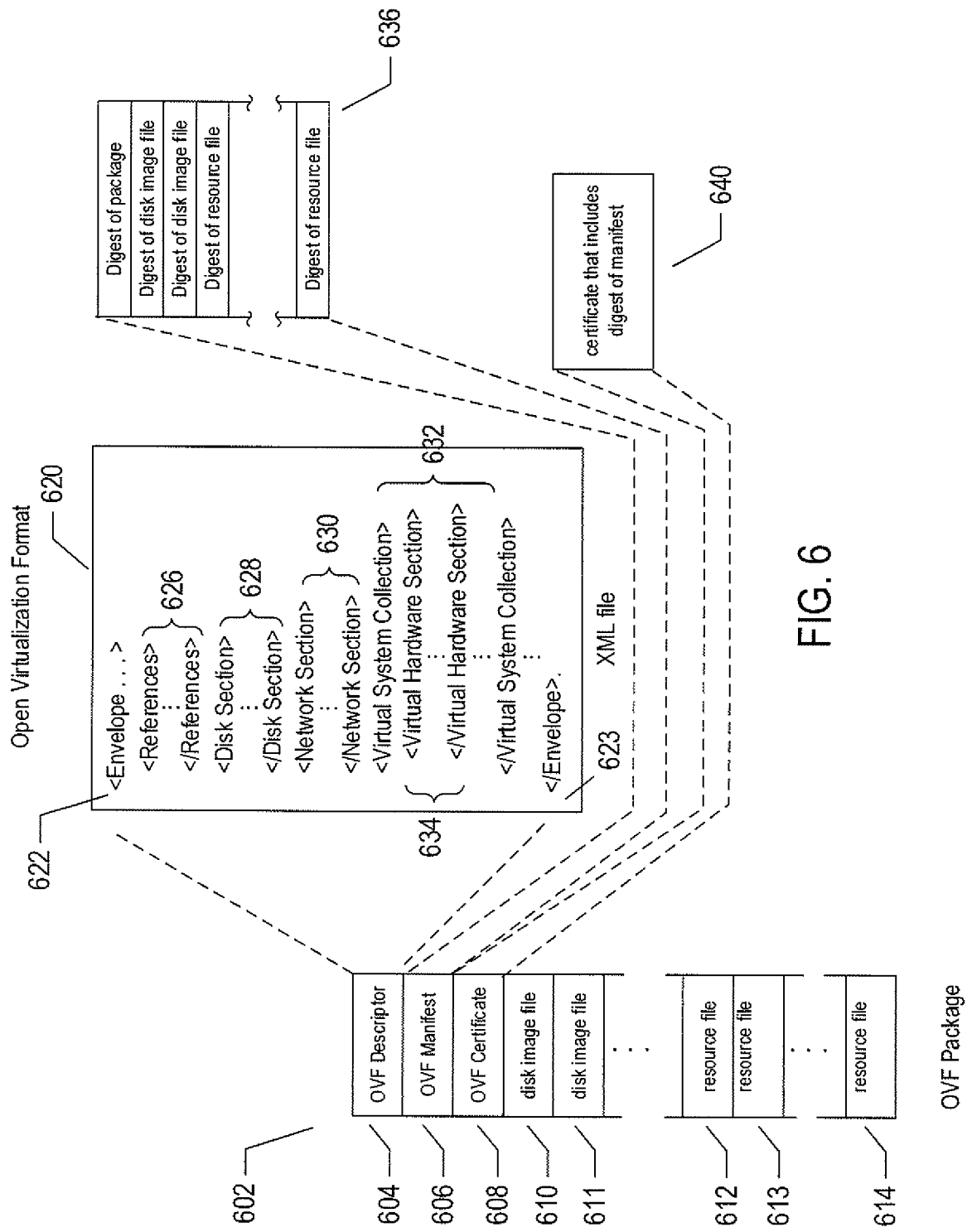
FIG. 6 shows an example of an open virtualization format package.

A VM or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a VM within one or more data files. FIG. 6 shows an OVF package. An OVF package 602 includes an OVF descriptor 604, an OVF manifest 606, an OVF certificate 608, one or more disk-image files 610-611, and one or more device files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a networks section 630 that includes meta information about all of the logical networks included in the OVF package, and a collection of virtual-machine configurations 632 which further includes hardware descriptions of each VM 634. There are many additional hierarchical levels and elements within a typical OVF descriptor. The OVF descriptor is thus a self-describing, XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and device files 612 are digitally encoded content, such as operating-system images. A VM or a collection of VMs encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more VMs that is encoded within an OVF package.

The advent of VMs and virtual environments has alleviated many of the difficulties and challenges associated with traditional general-purpose computing. Machine and operating-system dependencies can be significantly reduced or entirely eliminated by packaging applications and operating systems together as VMs and virtual appliances that execute within virtual environments provided by virtualization layers running on many different types of computer hardware. A next level of abstraction, referred to as virtual data centers or virtual infrastructure, provide a data-center interface to virtual data centers computationally constructed within physical data centers.

Figure 7:
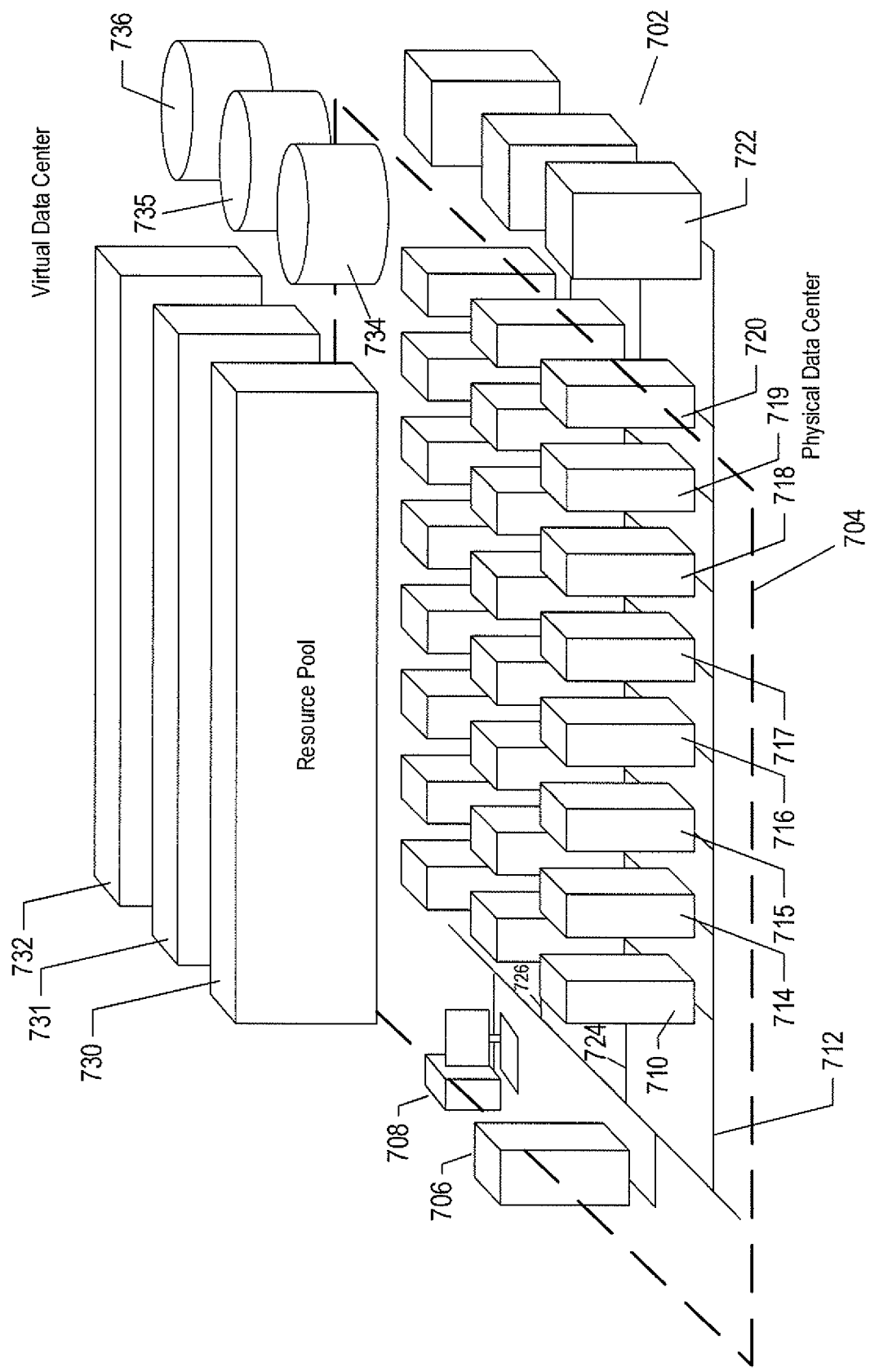
FIG. 7 shows virtual data centers provided as an abstraction of underlying physical-data-center hardware components.

FIG. 7 shows virtual data centers provided as an abstraction of underlying physical-data-center hardware components. In FIG. 7, a physical data center 702 is shown below a virtual-interface plane 704. The physical data center consists of a virtual-data-center management server 706 and any of various different computers, such as PCs 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight servers and a mass-storage array. The individual server computers, such as server computer 710, each includes a virtualization layer and runs multiple VMs. Different physical data centers may include many different types of computers, networks, data-storage systems and devices connected according to many different types of connection topologies. The virtual-interface plane 704, a logical abstraction layer shown by a plane in FIG. 7, abstracts the physical data center to a virtual data center comprising one or more device pools, such as device pools 730-732, one or more virtual data stores, such as virtual data stores 734-736, and one or more virtual networks. In certain implementations, the device pools abstract banks of physical servers directly interconnected by a local area network.

The virtual-data-center management interface allows provisioning and launching of VMs with respect to device pools, virtual data stores, and virtual networks, so that virtual-data-center administrators need not be concerned with the identities of physical-data-center components used to execute particular VMs. Furthermore, the virtual-data-center management server 706 includes functionality to migrate running VMs from one physical server to another in order to optimally or near optimally manage device allocation, provides fault tolerance, and high availability by migrating VMs to most effectively utilize underlying physical hardware devices, to replace VMs disabled by physical hardware problems and failures, and to ensure that multiple VMs supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of VMs and virtual appliances as well as to provide high-level, distributed functionalities that involve pooling the devices of individual physical servers and migrating VMs among physical servers to achieve load balancing, fault tolerance, and high availability.

Figure 8:
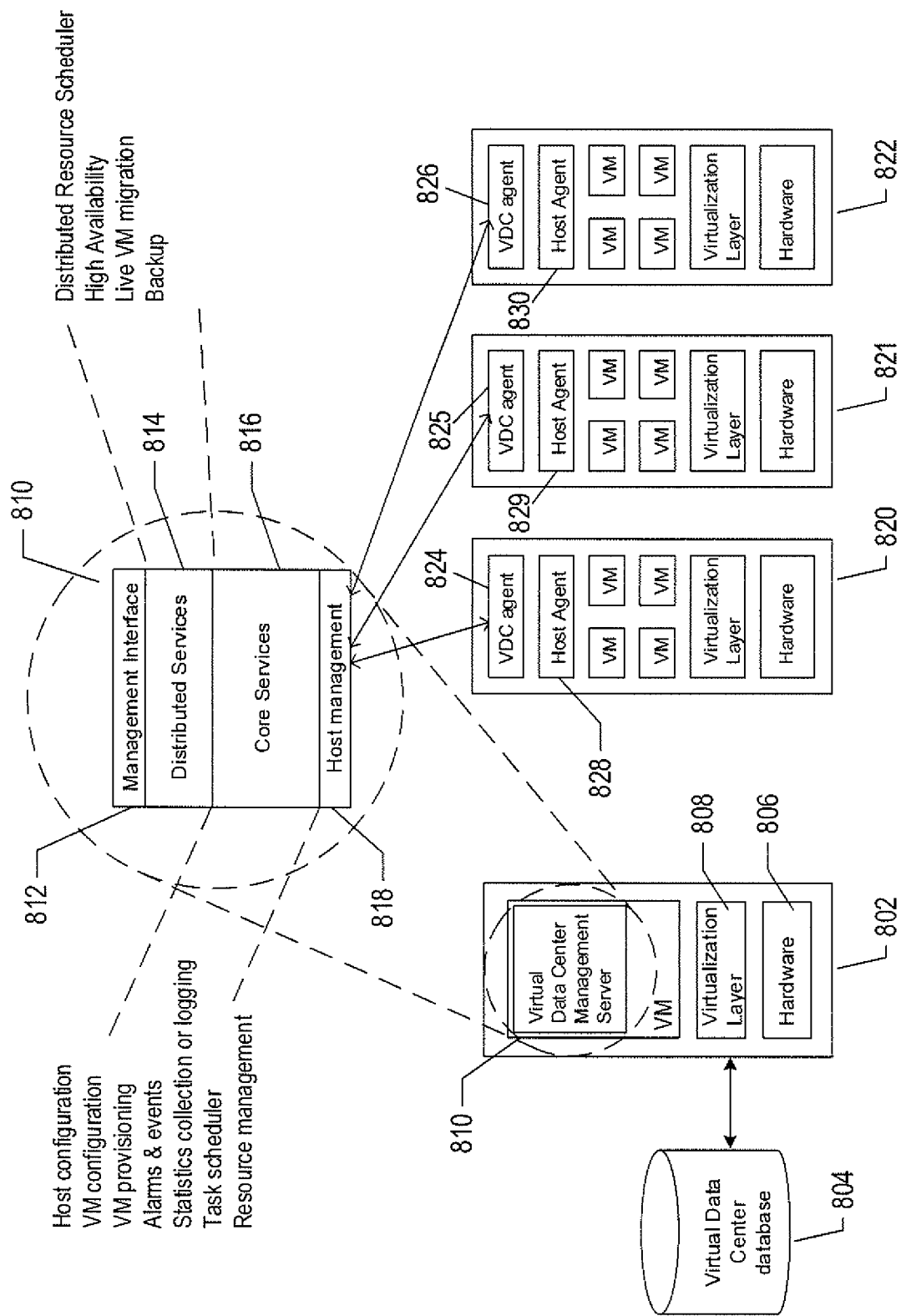
FIG. 8 shows virtual-machine components of a virtual-data-center management server and physical servers of a physical data center.

FIG. 8 shows virtual-machine components of a virtual-data-center management server and physical servers of a physical data center above which a virtual-data-center interface is provided by the virtual-data-center management server. The virtual-data-center management server 802 and a virtual-data-center database 804 comprise the physical components of the management component of the virtual data center. The virtual-data-center management server 802 includes a hardware layer 806 and virtualization layer 808, and runs a virtual-data-center management-server VM 810 above the virtualization layer. Although shown as a single server in FIG. 8, the virtual-data-center management server ("VDC management server") may include two or more physical server computers that support multiple VDC-management-server virtual appliances. The virtual-data-center management-server VM 810 includes a management-interface component 812, distributed services 814, core services 816, and a host-management interface 818. The host-management interface 818 is accessed from any of various computers, such as the PC 708 shown in FIG. 7. The host-management interface 818 allows the virtual-data-center administrator to configure a virtual data center, provision VMs, collect statistics and view log files for the virtual data center, and to carry out other, similar management tasks. The host-management interface 818 interfaces to virtual-data-center agents 824, 825, and 826 that execute as VMs within each of the physical servers of the physical data center that is abstracted to a virtual data center by the VDC management server.

The distributed services 814 include a distributed-device scheduler that assigns VMs to execute within particular physical servers and that migrates VMs in order to most effectively make use of computational bandwidths, data-storage capacities, and network capacities of the physical data center. The distributed services 814 further include a high-availability service that replicates and migrates VMs in order to ensure that VMs continue to execute despite problems and failures experienced by physical hardware components. The distributed services 814 also include a live-virtual-machine migration service that temporarily halts execution of a VM, encapsulates the VM in an OVF package, transmits the OVF package to a different physical server, and restarts the VM on the different physical server from a virtual-machine state recorded when execution of the VM was halted. The distributed services 814 also include a distributed backup service that provides centralized virtual-machine backup and restore.

The core services 816 provided by the VDC management server VM 810 include host configuration, virtual-machine configuration, virtual-machine provisioning, generation of virtual-data-center alarms and events, ongoing event logging and statistics collection, a task scheduler, and a device-management module. Each physical server 820-822 also includes a host-agent VM 828-830 through which the virtualization layer can be accessed via a virtual-infrastructure application programming interface ("API"). This interface allows a remote administrator or user to manage an individual server through the infrastructure API. The virtual-data-center agents 824-826 access virtualization-layer server information through the host agents. The virtual-data-center agents are primarily responsible for offloading certain of the virtual-data-center management-server functions specific to a particular physical server to that physical server. The virtual-data-center agents relay and enforce device allocations made by the VDC management server VM 810, relay virtual-machine provisioning and configuration-change commands to host agents, monitor and collect performance statistics, alarms, and events communicated to the virtual-data-center agents by the local host agents through the interface API, and to carry out other, similar virtual-data-management tasks.

The virtual-data-center abstraction provides a convenient and efficient level of abstraction for exposing the computational devices of a cloud-computing facility to cloud-computing-infrastructure users. A cloud-director management server exposes virtual devices of a cloud-computing facility to cloud-computing-infrastructure users. In addition, the cloud director introduces a multi-tenancy layer of abstraction, which partitions VDCs into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
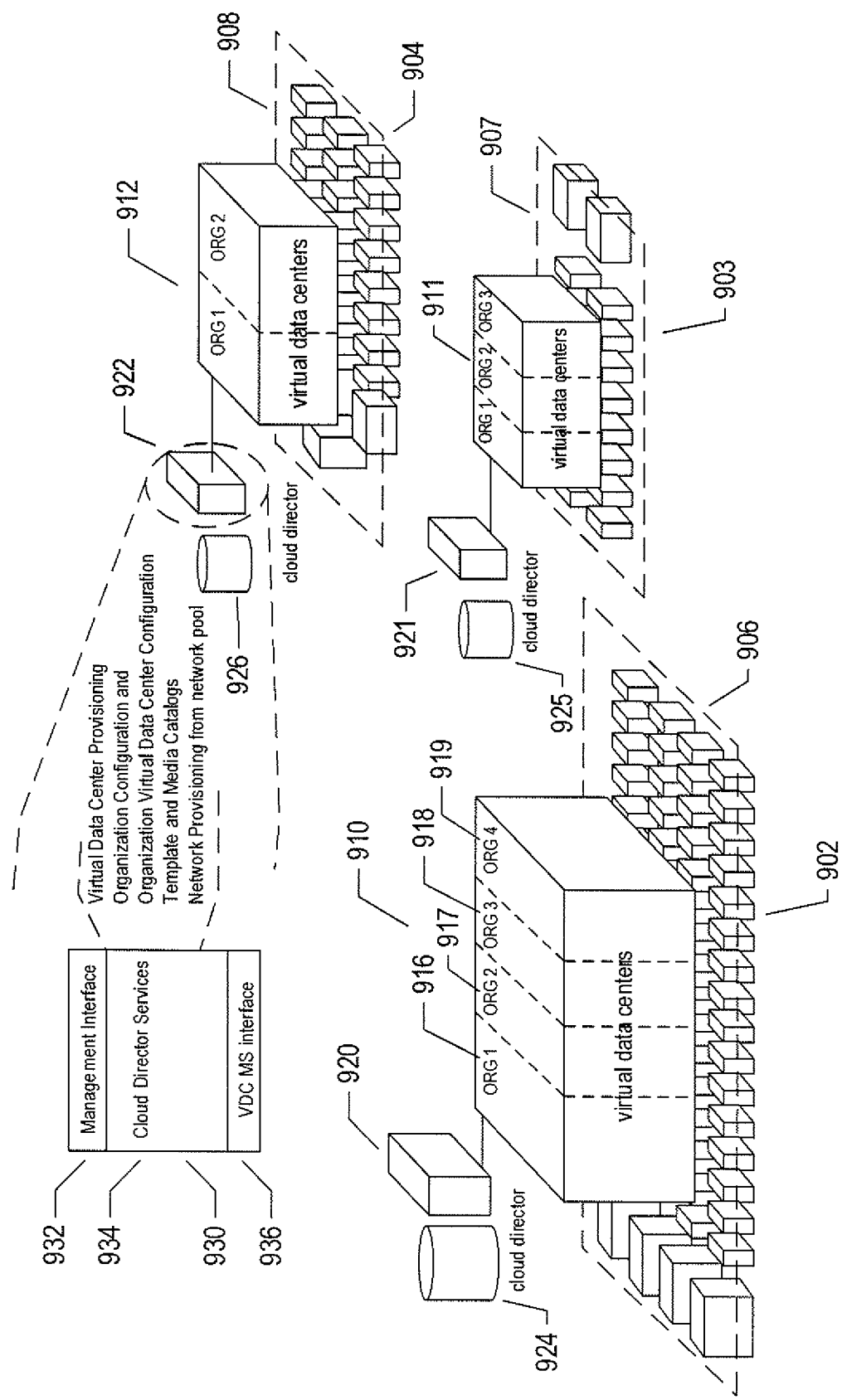
FIG. 9 shows a cloud-director level of abstraction.

FIG. 9 shows a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The devices of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director servers 920-922 and associated cloud-director databases 924-926. Each cloud-director server or servers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data center virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are VMs that each contains an OS and/or one or more VMs containing applications. A template may include much of the detailed contents of VMs and virtual appliances that are encoded within OVF packages, so that the task of configuring a VM or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VDC-server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 10:
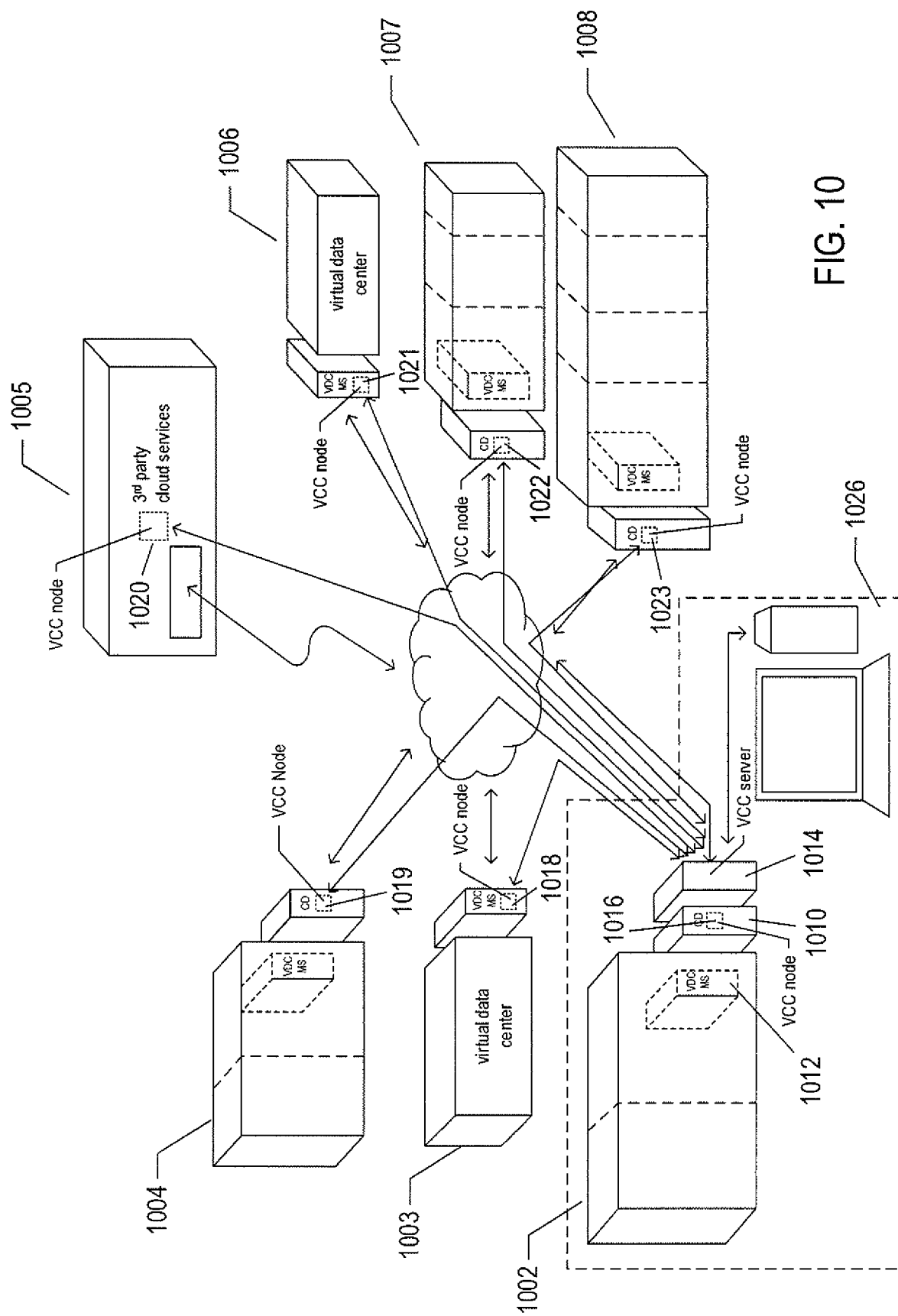
FIG. 10 shows virtual-cloud-connector nodes.

FIG. 10 shows virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are shown 1002-1008. Cloud-computing facility 1002 is a private multi-tenant cloud with a cloud director 1010 that interfaces to a VDC management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VDC management server that manages a single-tenant private cloud. The VCC server 1014 additionally interfaces, through the Internet, to VCC node virtual appliances executing within remote VDC management servers, remote cloud directors, or within the third-party cloud services 1018-1023. The VCC server provides a VCC server interface that can be displayed on a local or remote terminal, PC, or other computer system 1026 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

Containers and Containers Supported by Virtualization Layers

As mentioned above, while the virtual-machine-based virtualization layers, described in the previous subsection, have received widespread adoption and use in a variety of different environments, from personal computers to enormous distributed computing systems, traditional virtualization technologies are associated with computational overheads. While these computational overheads have steadily decreased, over the years, and often represent ten percent or less of the total computational bandwidth consumed by an application running above a guest operating system in a virtualized environment, traditional virtualization technologies nonetheless involve computational costs in return for the power and flexibility that they provide.

Figure 11:
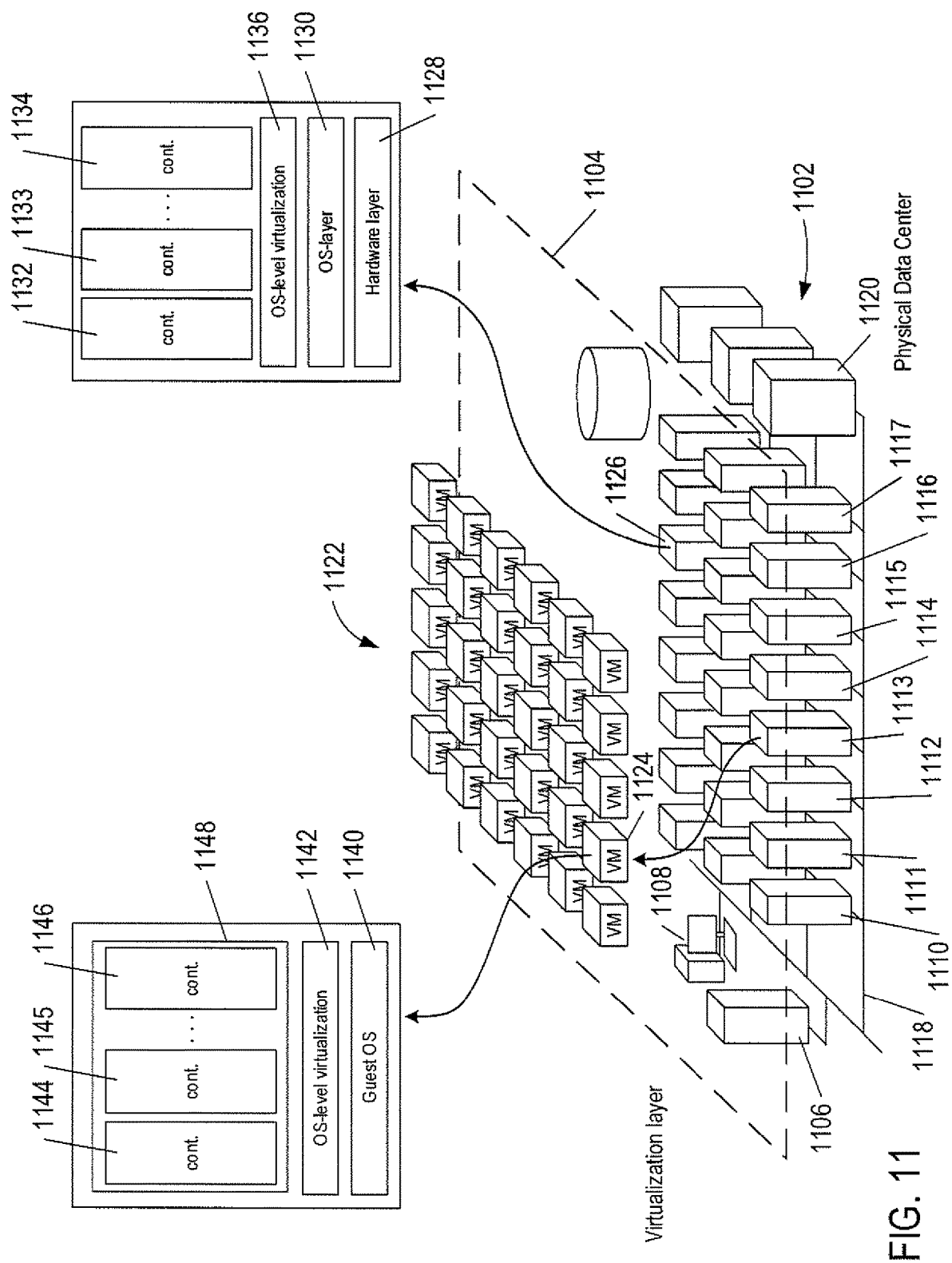
FIG. 11 shows two ways in which operating-system-level virtualization may be implemented in a physical data center.

Another approach to virtualization, as also mentioned above, is referred to as operating-system-level virtualization ("OSL virtualization"). FIG. 11 shows two ways in which OSL virtualization may be implemented in a physical data center 1102. In FIG. 11, the physical data center 1102 is shown below a virtual-interface plane 1104. The physical data center 1102 consists of a virtual-data-center management server 1106 and any of various different computers, such as PCs 1108, on which a virtual-data-center management interface may be displayed to system administrators and other users. The physical data center 1100 additionally includes a number of server computers, such as server computers 1110-1117, that are coupled together by local area networks, such as local area network 1118, that directly interconnects server computers 1110-1117 and a mass-storage array 1120. The physical data center 1102 includes three local area networks that each directly interconnects a bank of eight server computers and a mass-storage array. Certain server computers have a virtualization layer that run multiple VMs 1122. For example, server computer 1113 has a virtualization layer that is used to run VM 1124. Certain VMs and server computers may be used to host a number of containers. A server computer 1126 has a hardware layer 1128 and an operating system layer 1130 that is shared by a number of containers 1132-1134 via an OSL virtualization layer 1136 as described in greater detail below with reference to FIG. 12. Alternatively, the VM 1124 has a guest operating system 1140 and an OSL virtualization layer 1142. The guest operating system 1140 is shared by a number of containers 1144-1146 via the OSL virtualization layer 1142 as described in greater detail below with reference to FIG. 13.

While a traditional virtualization layer can simulate the hardware interface expected by any of many different operating systems, OSL virtualization essentially provides a secure partition of the execution environment provided by a particular operating system. As one example, OSL virtualization provides a file system to each container, but the file system provided to the container is essentially a view of a partition of the general file system provided by the underlying operating system of the host. In essence, OSL virtualization uses operating-system features, such as namespace isolation, to isolate each container from the other containers running on the same host. In other words, namespace isolation ensures that each application is executed within the execution environment provided by a container to be isolated from applications executing within the execution environments provided by the other containers. A container cannot access files not included the container's namespace and cannot interact with applications running in other containers. As a result, a container can be booted up much faster than a VM, because the container uses operating-system-kernel features that are already available and functioning within the host. Furthermore, the containers share computational bandwidth, memory, network bandwidth, and other computational resources provided by the operating system, without the overhead associated with computational resources allocated to VMs and virtualization layers. Again, however, OSL virtualization does not provide many desirable features of traditional virtualization. As mentioned above, OSL virtualization does not provide a way to run different types of operating systems for different groups of containers within the same host and OSL-virtualization does not provide for live migration of containers between hosts, high-availability functionality, distributed resource scheduling, and other computational functionality provided by traditional virtualization technologies.

Figure 12:
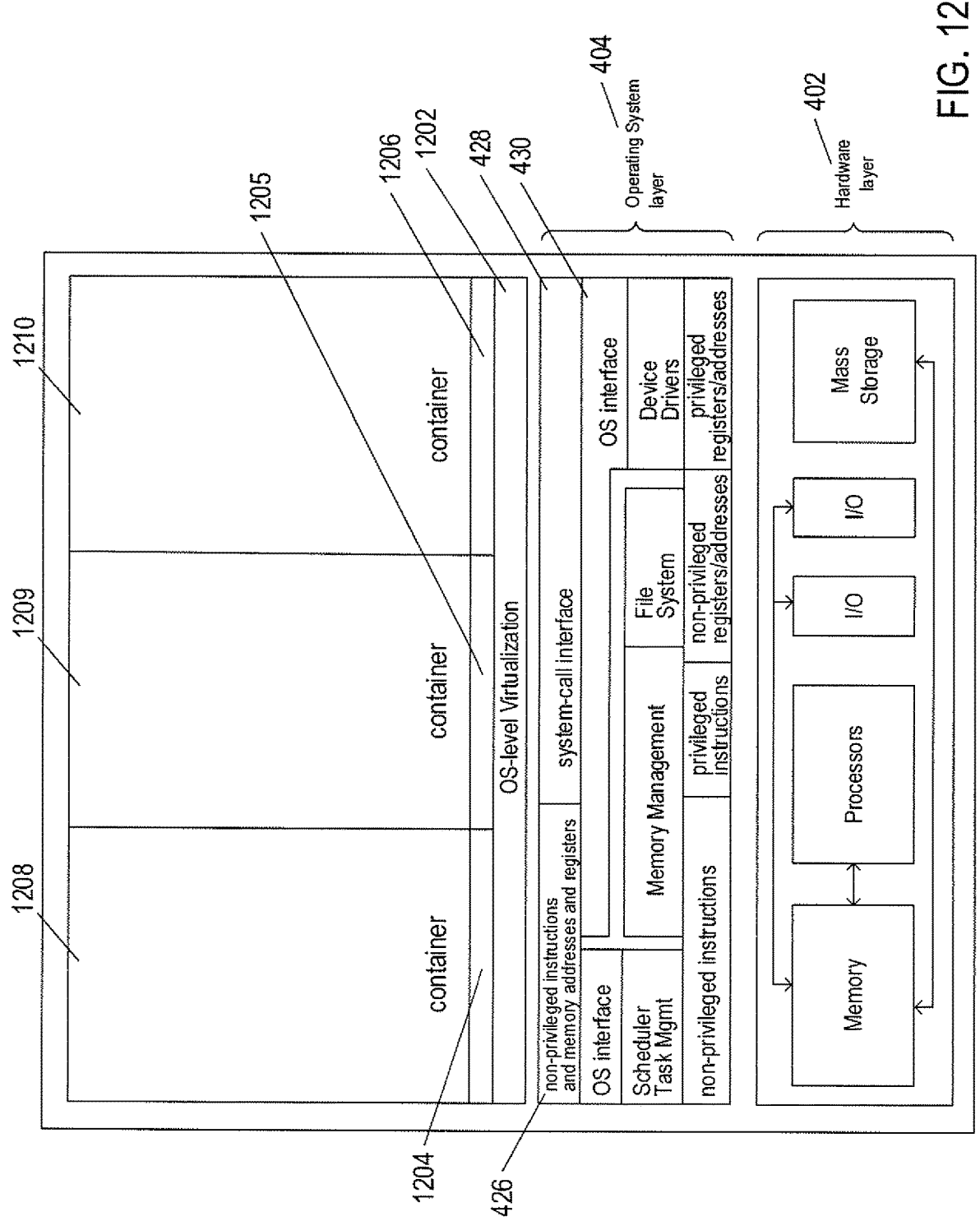
FIG. 12 shows an example server computer used to host three containers.

FIG. 12 shows an example server computer used to host three containers. As discussed above with reference to FIG. 4, an operating system layer 404 runs above the hardware 402 of the host computer. The operating system provides an interface, for higher-level computational entities, that includes a system-call interface 428 and the non-privileged instructions, memory addresses, and registers 426 provided by the hardware layer 402. However, unlike in FIG. 4, in which applications run directly above the operating system layer 404, OSL virtualization involves an OSL virtualization layer 1202 that provides operating-system interfaces 1204-1206 to each of the containers 1208-1210. The containers, in turn, provide an execution environment for an application that runs within the execution environment provided by container 1308. The container can be thought of as a partition of the resources generally available to higher-level computational entities through the operating system interface 430.

Figure 13:
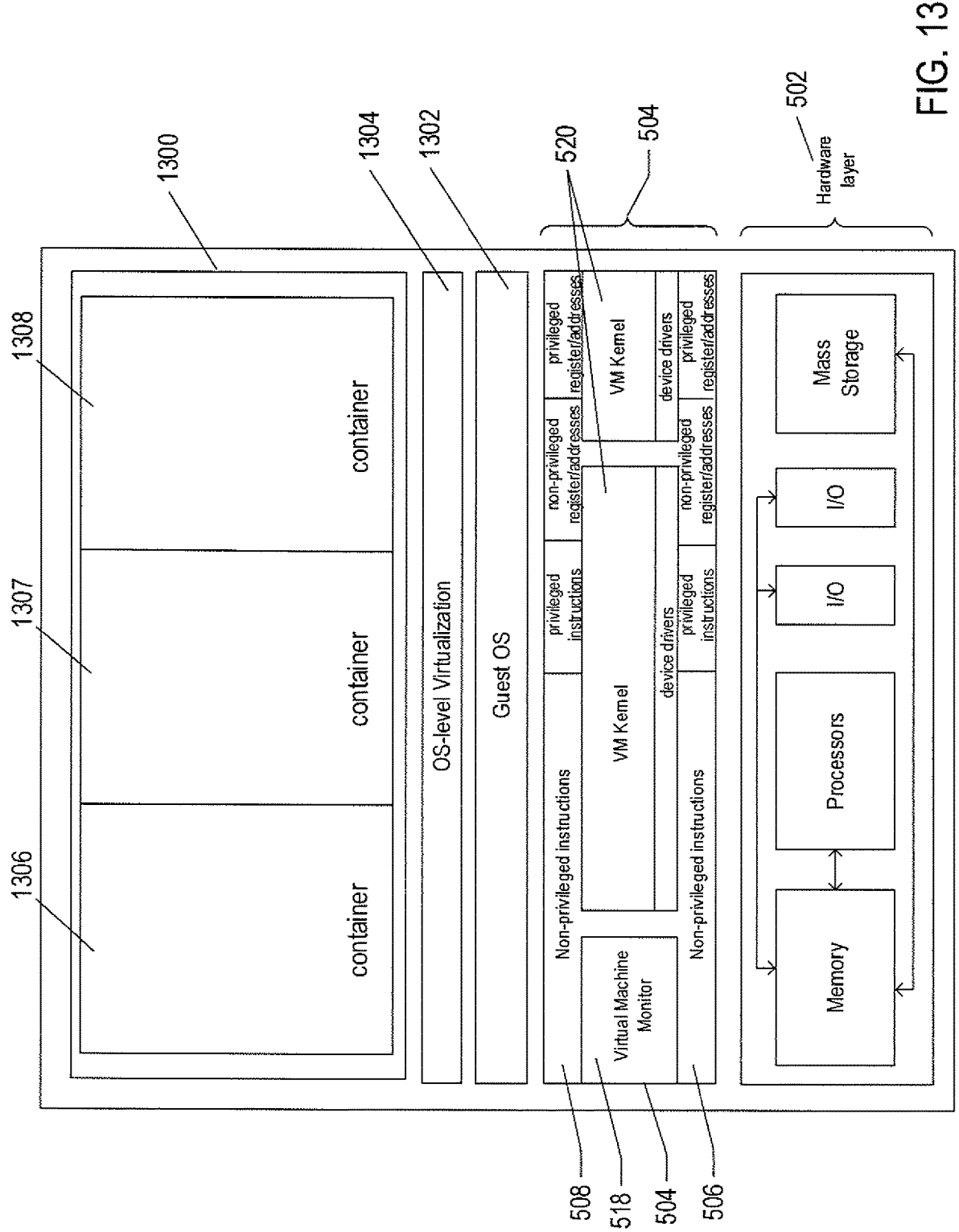
FIG. 13 shows an approach to implementing containers on a virtual machine.

FIG. 13 shows an approach to implementing the containers on a VM. FIG. 13 shows a host computer similar to that shown in FIG. 5A, discussed above. The host computer includes a hardware layer 502 and a virtualization layer 504 that provides a virtual hardware interface 508 to a guest operating system 1302. Unlike in FIG. 5A, the guest operating system interfaces to an OSL-virtualization layer 1304 that provides container execution environments 1306-1308 to multiple application programs.

Note that, although only a single guest operating system and OSL virtualization layer are shown in FIG. 13, a single virtualized host system can run multiple different guest operating systems within multiple VMs, each of which supports one or more OSL-virtualization containers. A virtualized, distributed computing system that uses guest operating systems running within VMs to support OSL-virtualization layers to provide containers for running applications is referred to, in the following discussion, as a "hybrid virtualized distributed computing system."

Running containers above a guest operating system within a VM provides advantages of traditional virtualization in addition to the advantages of OSL virtualization. Containers can be quickly booted in order to provide additional execution environments and associated resources for additional application instances. The resources available to the guest operating system are efficiently partitioned among the containers provided by the OSL-virtualization layer 1304 in FIG. 13, because there is almost no additional computational overhead associated with container-based partitioning of computational resources. However, many of the powerful and flexible features of the traditional virtualization technology can be applied to VMs in which containers run above guest operating systems, including live migration from one host to another, various types of high-availability and distributed resource scheduling, and other such features. Containers provide share-based allocation of computational resources to groups of applications with guaranteed isolation of applications in one container from applications in the remaining containers executing above a guest operating system. Moreover, resource allocation can be modified at run time between containers. The traditional virtualization layer provides for flexible and scaling over large numbers of hosts within large distributed computing systems and a simple approach to operating-system upgrades and patches. Thus, the use of OSL virtualization above traditional virtualization in a hybrid virtualized distributed computing system, as shown in FIG. 13, provides many of the advantages of both a traditional virtualization layer and the advantages of OSL virtualization.

Figure 14:
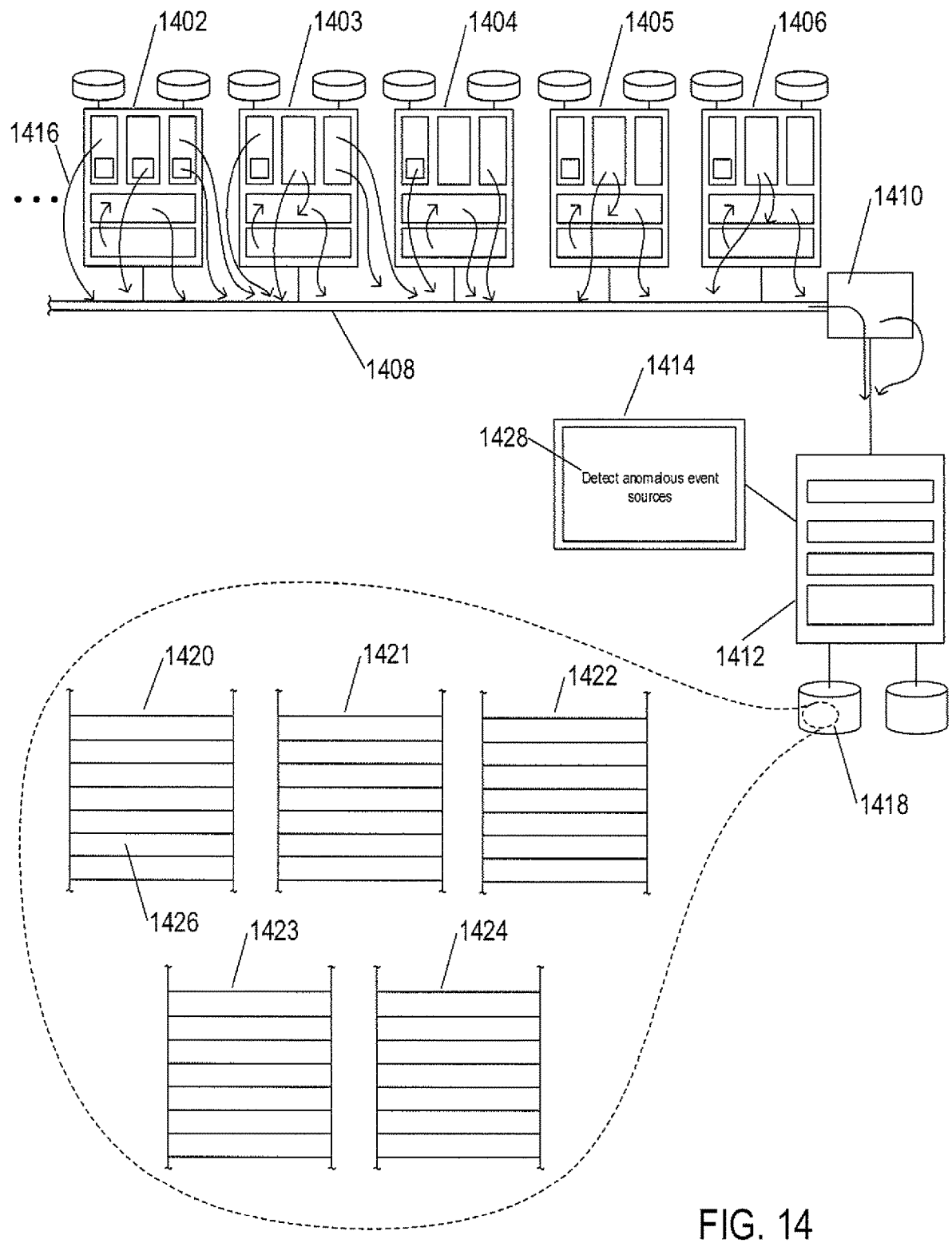
FIG. 14 shows an example of logging event messages in event logs.

Methods and Systems to Identify Anomalous Behaving Server Computers of a Distributed Computing System FIG. 14 shows an example of logging event messages in event logs. In FIG. 14, a number of computer systems 1402-1406 within a distributed computing system are linked together by an electronic communications medium 1408 and additionally linked through a communications bridge/router 1410 to an administration computer system 1412 that includes an administrative console 1414. As indicated by curved arrows, such as curved arrow 1416, multiple components within each of the discrete computer systems 1402-1406 as well as the communications bridge/router 1410 generate event messages that are transmitted to the administration computer 1412. Event messages may be generated by any event source. Event sources may be, but are not limited to, application programs, operating systems, VMs, guest operating systems, containers, network devices, machine codes, event channels, and other computer programs or processes running on the computer systems 1402-1406, the bridge/router 1410 and any other components of the distributed computing system. Event messages may be relatively directly transmitted from a component within a discrete computer system to the administration computer 1412 or may be collected at various hierarchical levels within a discrete computer system and then forwarded from an event-message-collecting entity within the discrete computer system to the administration computer 1412. The administration computer 1412 collects and may store the received event messages in a data-storage device or appliance 1418 as event logs 1420-1424. Rectangles, such as rectangle 1426, represent individual event messages. For example, event log 1420 may comprise a list of event messages generated within the computer system 1402. Methods described below enable an administrator, or other user, to detect anomalous event sources 1428 within a population of event sources.

Figure 15:
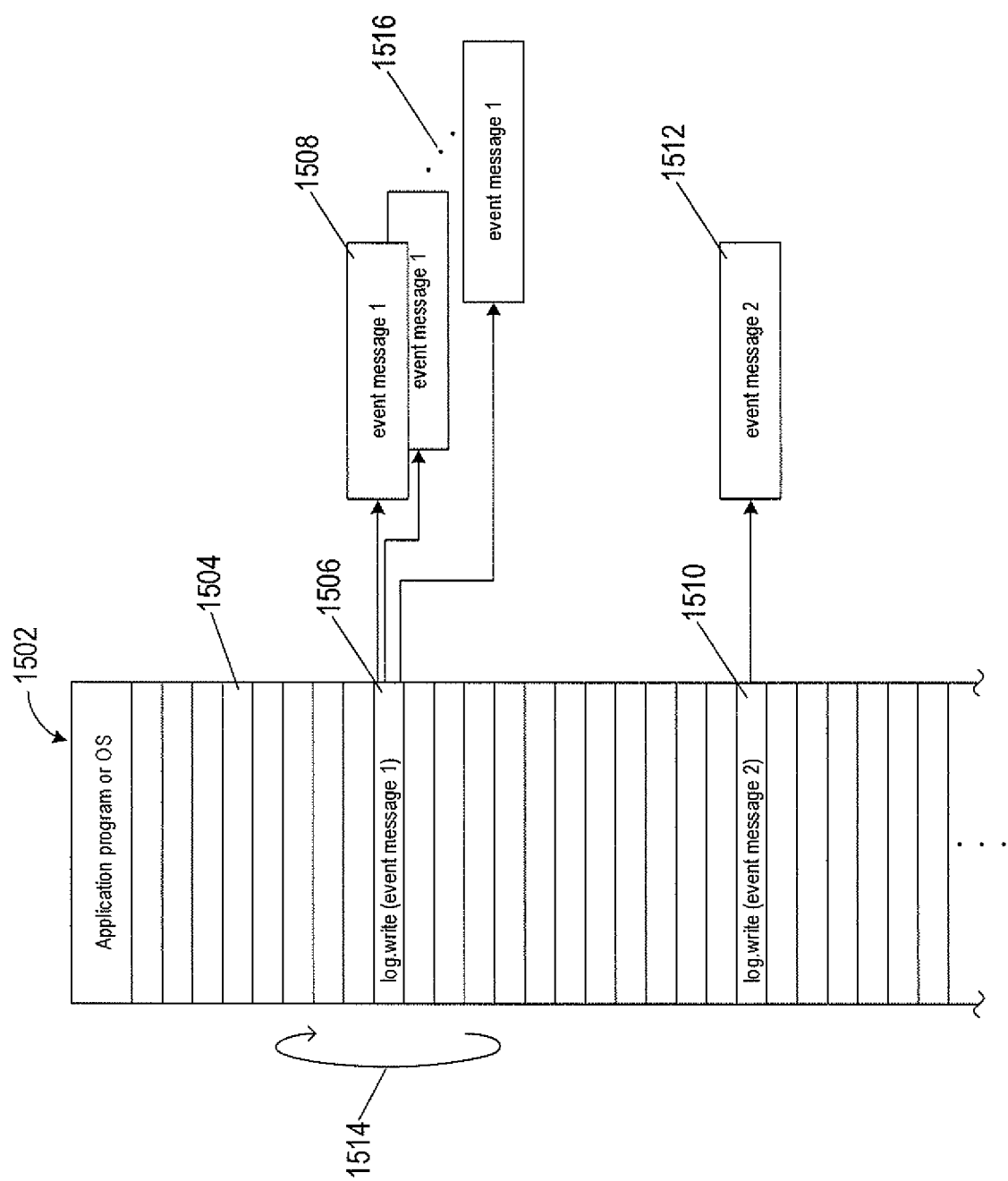
FIG. 15 shows an example of a source code with log write instructions.

FIG. 15 shows an example of a source code 1502 of an application program, an operating system, a VM, a guest operating system, or any other computer program or machine code. The source code 1502 is just one example of an event source that generates event messages. Rectangles, such as rectangle 1504, represent a definition, a comment, a statement, or a computer instruction that expresses some action to be executed by a computer. The source code 1502 includes log write instructions that generate event messages when certain events predetermined by the developer occur during execution of the source code 1502. For example, source code 1502 includes an example log write instruction 1506 that when executed generates an "event message 1" represented by rectangle 1508, and a second example log write instruction 1510 that when executed generates "event message 2" represented by rectangle 1512. In the example of FIG. 15, the log write instruction 1508 is embedded within a set of computer instructions that are repeatedly executed in a loop 1514. As shown in FIG. 15, the same event message 1 is repeatedly generated 1516. The same type of log write instructions may also be located in different places throughout the source code, which in turns creates repeats of essentially the same type of event message in the event log.

In FIG. 15, the notation "log.write( )" is a general representation of a log write instruction. In practice, the form of the log write instruction varies for different programming languages. In general, event messages are relatively cryptic, including generally only one or two natural-language words and/or phrases as well as various types of text strings that represent file names, path names, and, perhaps various alphanumeric parameters. In practice, a log write instruction may also include the name of the source of the event message (e.g., name of the application program or operating system and version) and the name of the event log to which the event message is written. Log write instructions may be written in a source code by the developer of an application program or operating system in order to record events that occur while an operating system or application program is running. For example, a developer may include log write instructions that are executed when certain events occur, such as failures, logins, or errors.

FIG. 16 shows an example of a log write instruction 1602. In the example of FIG. 16, the log write instruction 1602 includes arguments identified with "$." For example, the log write instruction 1602 includes a time-stamp argument 1604, a thread number argument 1605, and an internet protocol ("IP") address argument 1606. The example log write instruction 1602 also includes text strings and natural-language words and phrases that identify the type of event that triggered the log write instruction, such as "Repair session" 1608. The text strings between brackets "[ ]" represent file-system paths, such as path 1610. When the log write instruction 1602 is executed, parameters are assigned to the arguments and the text strings and natural-language words and phrases are stored as an event message in an event log.

FIG. 17 shows an example of an event message 1702 generated by the log write instruction 1602. The arguments of the log write instruction 1602 may be assigned numerical parameters that are recorded in the event message 1702 at the time the event message is written to the event log. For example, the time stamp 1604, thread 1605, and IP address 1606 of the log write instruction 1602 are assigned corresponding numerical parameters 1704-1706 in the event message 1702. The time stamp 1704, in particular, represents the date and time the event message is generated. The text strings and natural-language words and phrases of the log write instruction 1602 also appear unchanged in the event message 1702 and may be used to identify the type of event that occurred during execution of the application program or operating system.

As event messages are received from various event sources, the event messages are stored in the order in which the event messages are received. FIG. 18 shows a small, eight-entry portion of an event log 1802. In FIG. 18, each rectangular cell, such as rectangular cell 1804, of the portion of the event log 1802 represents a single stored event message. For example, event message 1802 includes a short natural-language phrase 1806, date 1808 and time 1810 numerical parameters, as well as, a numerical parameter 1812 that appears to identify a particular host computer.

The text strings and natural-language words and phrases of each event message describe a particular type of event called an "event type." For example, the text strings and natural-language words and phrases, called "non-parametric tokens," of the event message 1702 shown in FIG. 17 identify the event type. As explained above, each time the log write instruction 1602 of FIG. 16 is executed, only the parameter values are changed, such as the time and date. The non-variable text strings and natural-language words and phrases (i.e., non-parametric tokens) are the same for each event message generated by the log write instruction 1602 and stored in the event log. Event-type analysis may be used to identify the event type of each event message based on the non-parametric tokens, and event messages of the same event type may be counted. A record of the different event types and number of each event type may be recorded in a meta-data structure referred to in the following description as an event-type log.

In a distributed computer system, a set of event sources may be running simultaneously on a number of different devices or virtual resources of a distributed computing system as described above. An event source may be an operating system, application program, VM, or machine code. For example, the event sources may be copies of the same operating system running on a number of different server computers, may be copies of the same guest operating system running the same applications on a number of different server computers, or may be copies of the same application program running on a number of different server computers. After these event sources have been running over an observation time window, $\Delta T$, it is expected that the log files generated by the event sources be approximately the same. In other words, it is expected that a plurality of event sources would generate similar event logs. In particular, these event logs should have approximately the same frequency of event types generated over the observation time window $\Delta T$. The observation time window $\Delta T$ may be a historical window of time or may be a run-time window. An event log that is different from a plurality of event logs generated by event sources may be used to identify the event source as an event source outlier. Methods described below are directed to identifying which event sources of a set of event sources are outliers. A component of a distributed computing system that runs an event source outlier may be identified for management purposes, such as, but not limited to, identified for troubleshooting, identified as having problems or issues, or may be identified for monitoring in case of future problems.

Figure 19A:
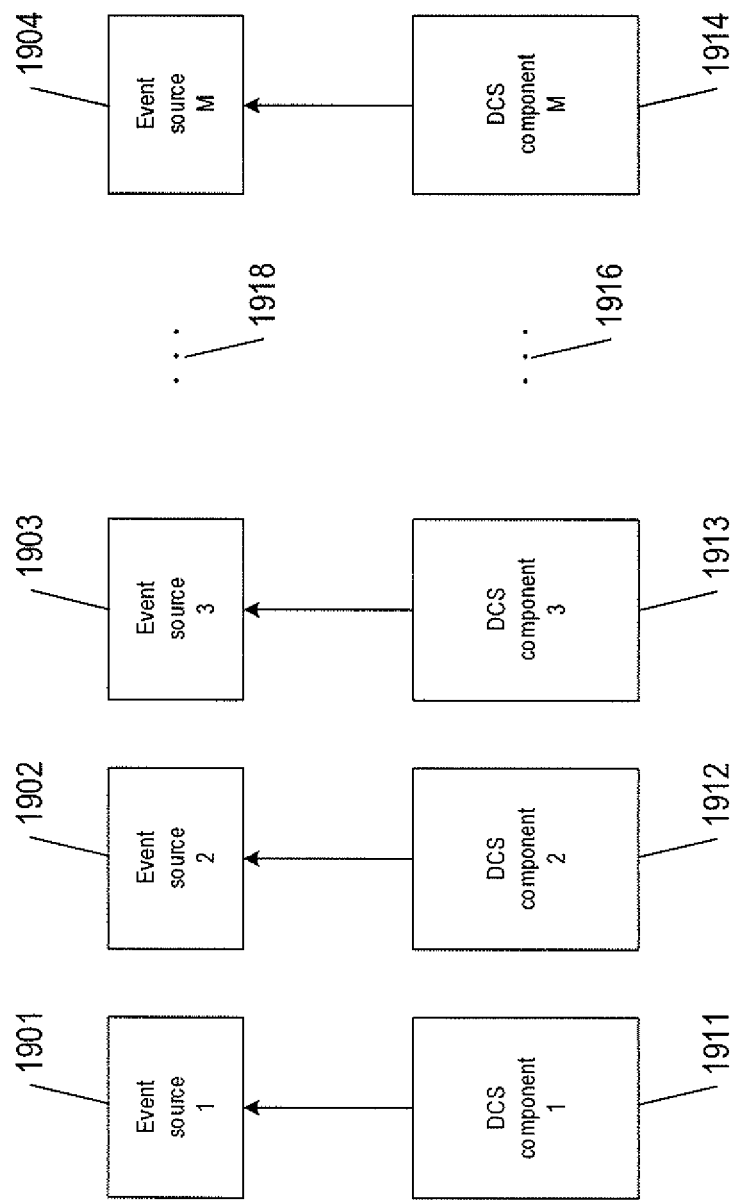
FIGS. 19A-19B show an example set of similar event sources corresponding to server computers and event logs generated by the similar event sources.
Figure 19B:
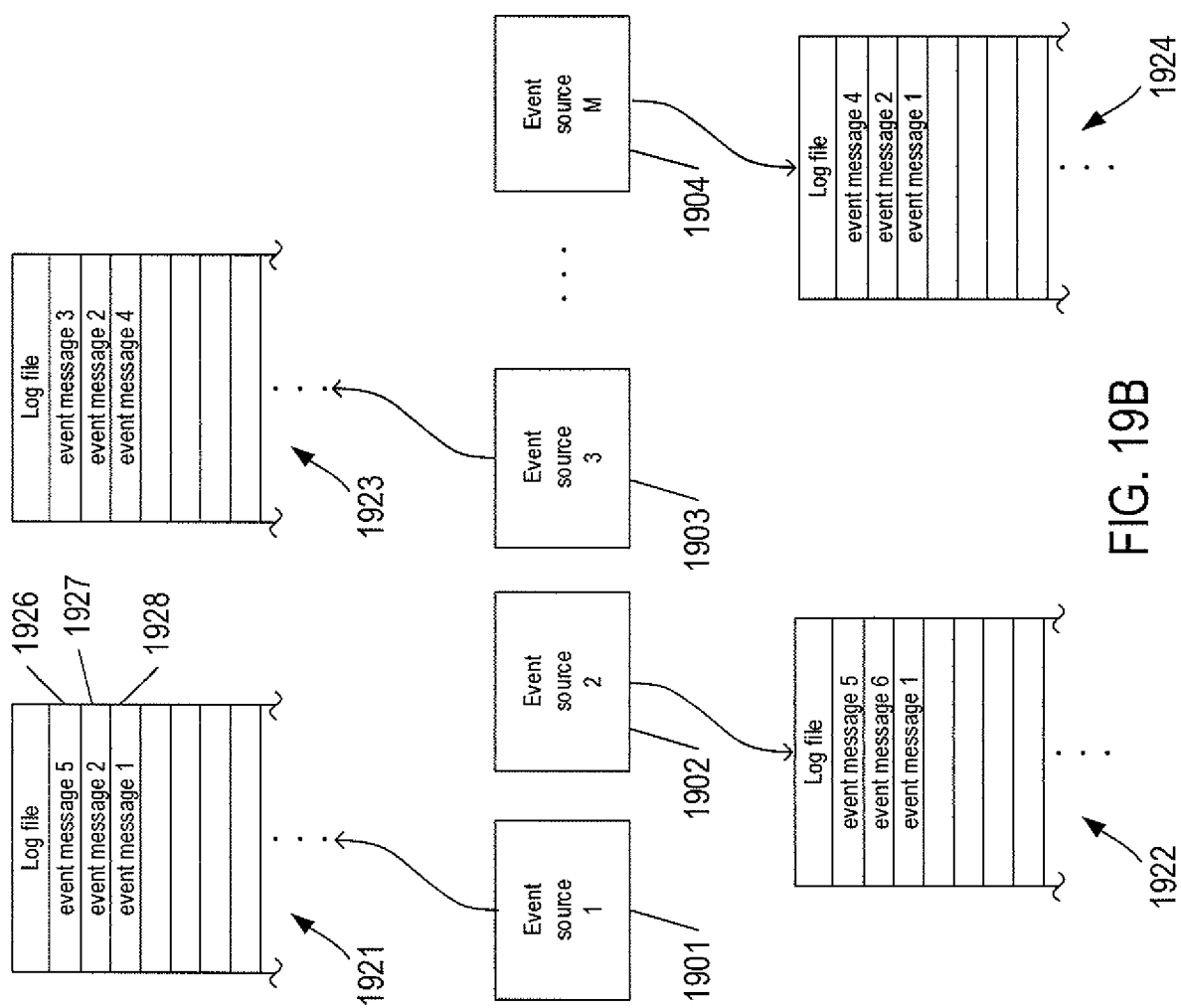

FIG. 19A shows an example set of M event sources and M corresponding distributed computing system components, where M denotes the number of event sources and corresponding components of a distributed computing system. The event sources 1901-1904 are identified as "event source 1," "event source 2," "event source 3," and "event source M." The event sources 1, 2, 3, . . . , M may represent M copies of the same application program, same operating system, VM, or guest operating system running on the corresponding components 1911-1914. An ellipsis, such as ellipsis 1916, represents event sources and corresponding components between event source 3 and event source M. FIG. 19B shows M event logs generated by the M event sources as described above with reference to FIGS. 11-15. In FIG. 19B, the event sources 1901-1904 generate corresponding event logs 1921-1924. The event logs 1921-1924 represent the event messages generated by the corresponding event sources 1901-1904 in an observation time window $\Delta T$. For example, rectangles 1926-1928 represent three different event messages "event message 5," "event message 2," and "event message 1" generated by event source 1 1901 within the observation time window $\Delta T$. Because the event sources 1, 2, 3, . . . , M are similar, the corresponding event logs are expected to generate event messages in which each event type occurs with approximately the same frequency in each of the event logs over the observation time window $\Delta T$. An event log that is different from the other event logs may be identified for management purposes, such as identified as having a problem at the component used to host the event source. However, the event logs may each have many thousands or even millions of event messages generated within the observation time window $\Delta T$. Attempts to compare event logs in order to identify which of the event logs may be different from the others event logs would be an extremely costly and time consuming task to carry out manually.

Methods collect the event logs generated by the event sources within the observation time window ΔT. Event-type analysis is performed on each of the event logs in order to identify the different event types. The frequency of each event type is determined by counting the number of times each event type occurs within the observation time window ΔT. The different event types and associated frequencies for each event source are recorded in an event-type log.

Figure 20:
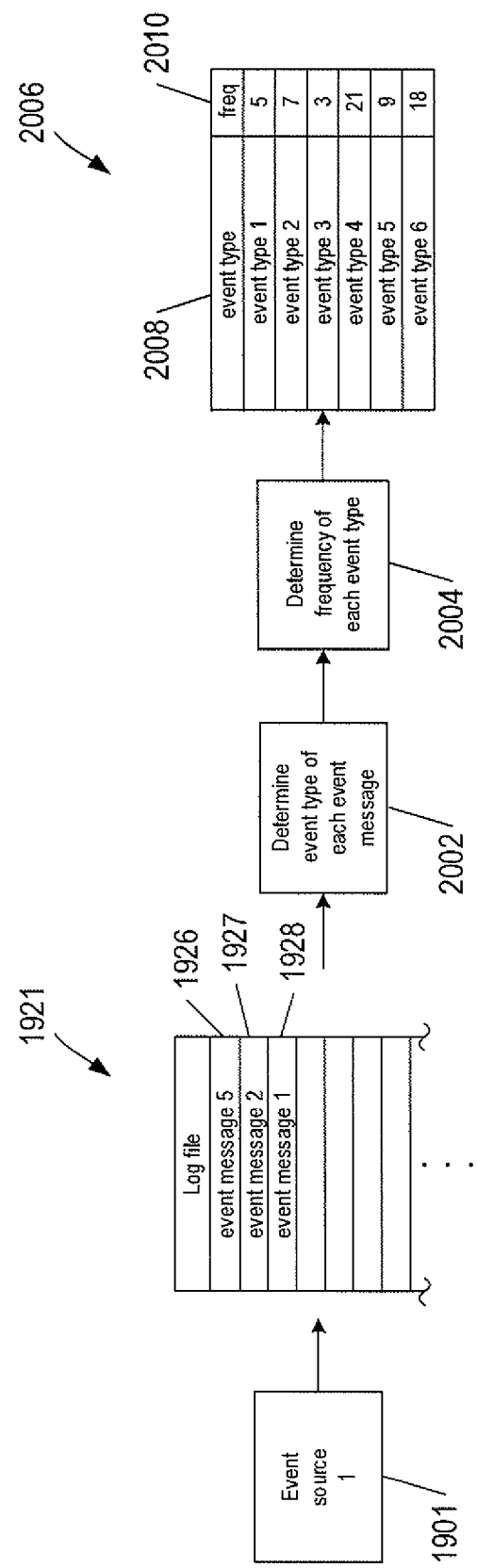
FIG. 20 shows an example of a method to determine an event-type log from an event log.

FIG. 20 shows examples of an event-type log generated from the event log 1921 of the event source 1 1901. In block 2002, event-type analysis is used to determine the event type of the event message in the event log 1921. Event type analysis determines the non-parametric tokens of each event message. Event messages having the same non-parametric tokens may be regarded as being of the same event type. Event message 5 1926 belongs to an event type denoted by "event type 5," event message 2 1927 belongs to an event type denoted by "event message 2," and event message 1 1928 belongs to an event type denoted by "event message 1." In block 2004, the frequency of each event type is determined by counting the number of times event messages of the same event type occur with the same observation time window ΔT. The different event types and associated frequencies are recorded in an event-type log 2006. Column 2008 lists the event types determined in block 2002. Column 2010 list the frequencies of each event type determined in block 2004. For the sake of simplicity, in this example the event messages belong to one of six different event types with event type 1 generated five times, event type 2 generated 7 times and so on within the observation time window ΔT.

Event-type analysis introduced in block 2002 discards punctuation, parentheses, brackets, and numerical parameters of an event message. In other words, event-type analysis is performed to reduce an event message of interest to text strings and natural-language words and phrases (i.e., non-parametric tokens).

Figure 21:
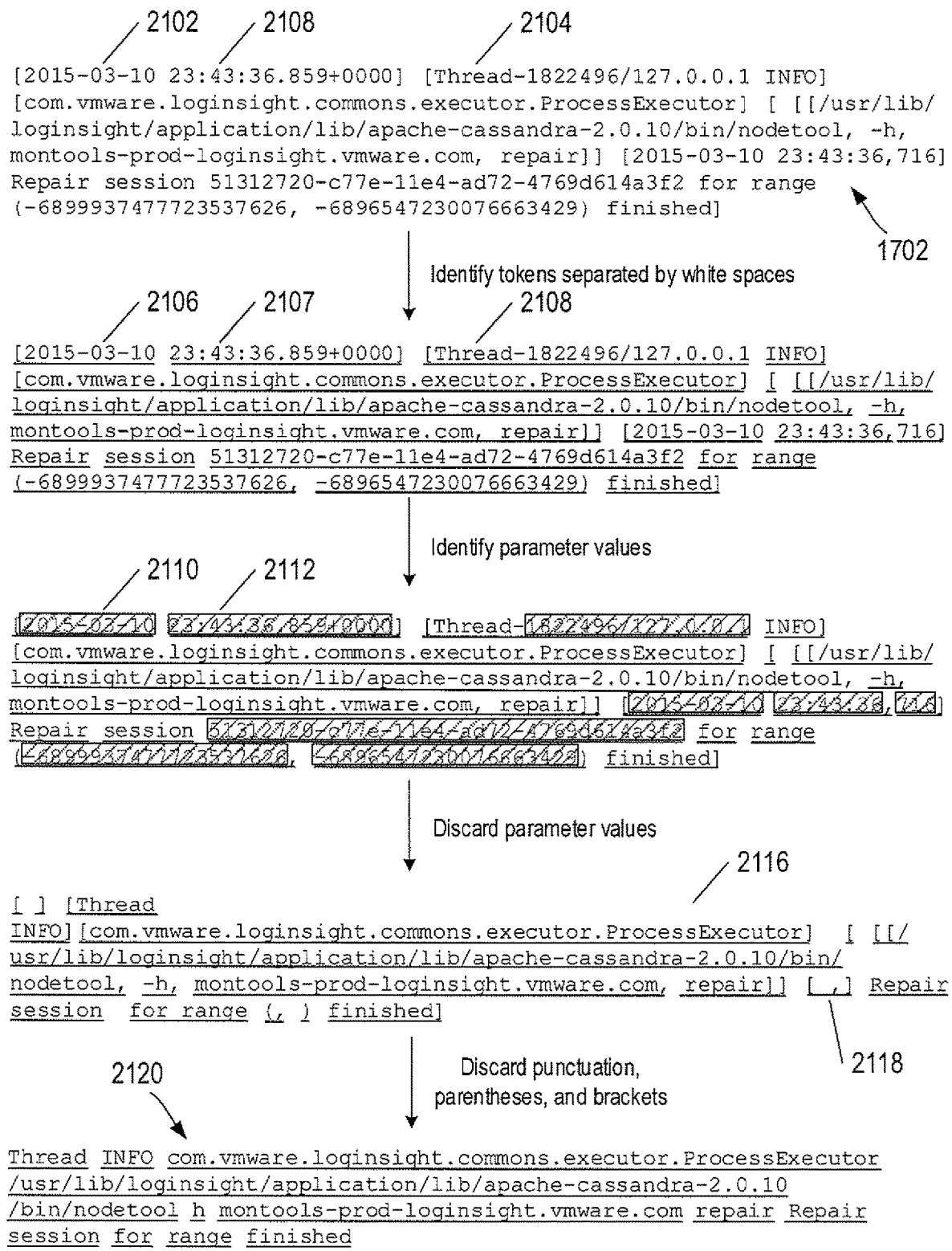
FIG. 21 shows an example of event-type analysis performed on an event message.

FIG. 21 shows an example of event-type analysis performed on the event message 1702 shown in FIG. 17. The event message 1702 is first tokenized by considering the event message as comprising tokens separated by non-printed characters, referred to as "white space." In FIG. 21, this initial tokenization of the event message 1702 is illustrated by underlining of the printed or visible characters. For example, the date 2102, time 2103, and thread 2104 at the beginning of the text contents of the event message 2102, following initial tokenization, become a first token 2106, a second token 2107, and a third token 2108, as indicated by underlining.

Next, a token-recognition pass is made to recognize any of the initial tokens as various types of parameters. Parameters are tokens or message fields that are likely to be highly variable over a set of messages of a particular type. Date/time stamps, for example, are nearly unique for each event message, with two event messages having an identical date/time stamp only in the case that the two event messages are generated within less than a second of one another. Additional examples of parameters include global unique identifiers ("GUIDs"), hypertext transfer protocol status values ("HTTP statuses"), universal resource locators ("URLs"), network addresses, and other types of common information entities that identify variable aspects of a type of event. By contrast, the phrase "Repair session" in event message 1702 likely occurs within each of a large number of repair session event messages. In FIG. 21, the parametric-valued tokens in the event message following initial token recognition are indicated by shading. For example, initial token recognition determines that the first token 2106 is a date and the second token 2107 is a time. The tokens identified as parameters are identified by shaded rectangles, such as shaded rectangle 2110 of the date 2106 and shaded rectangle of 2112 of the time 2107. The parametric-valued tokens are discarded leaving the non-parametric text strings, natural language words and phrases, punctuation, parentheses, and brackets.

Various types of symbolically encoded values, including dates, times, machine addresses, network addresses, and other such parameters can be recognized using regular expressions or programmatically. For example, there are numerous ways to represent dates. A program or a set of regular expressions can be used to recognize symbolically encoded dates in any of the common formats. It is possible that the token-recognition process may incorrectly determine that an arbitrary alphanumeric string represents some type of symbolically encoded parameter when, in fact, the alphanumeric string only coincidentally has a form that can be interpreted to be a parameter. The currently described methods and systems do not depend on absolute precision and reliability of the event-message-preparation process. Occasional misinterpretations generally do not result in mistyping of event messages and, in the rare circumstances in which event messages may be mistyped, the mistyping is most often discovered during subsequent processing.

In the implementation shown in FIG. 21, the event message 1702 is subject to textualization in which an additional token-recognition step of the non-parametric portions of the event message is performed in order to remove punctuation and separation symbols, such as parentheses and brackets, commas, and dashes that occur as separate tokens or that occur at the leading and trailing extremities of previously recognized non-parametric tokens, as shown by underlining in the retokenized event message 2114 in FIG. 21. For example, brackets and a coma 2118 are underlined. The punctuation, parentheses, and brackets are discarded leaving a textualized event message of interest 2120 that comprises only the non-parametric text strings and natural language words and phrases of the original event message 1702.

Figure 22:
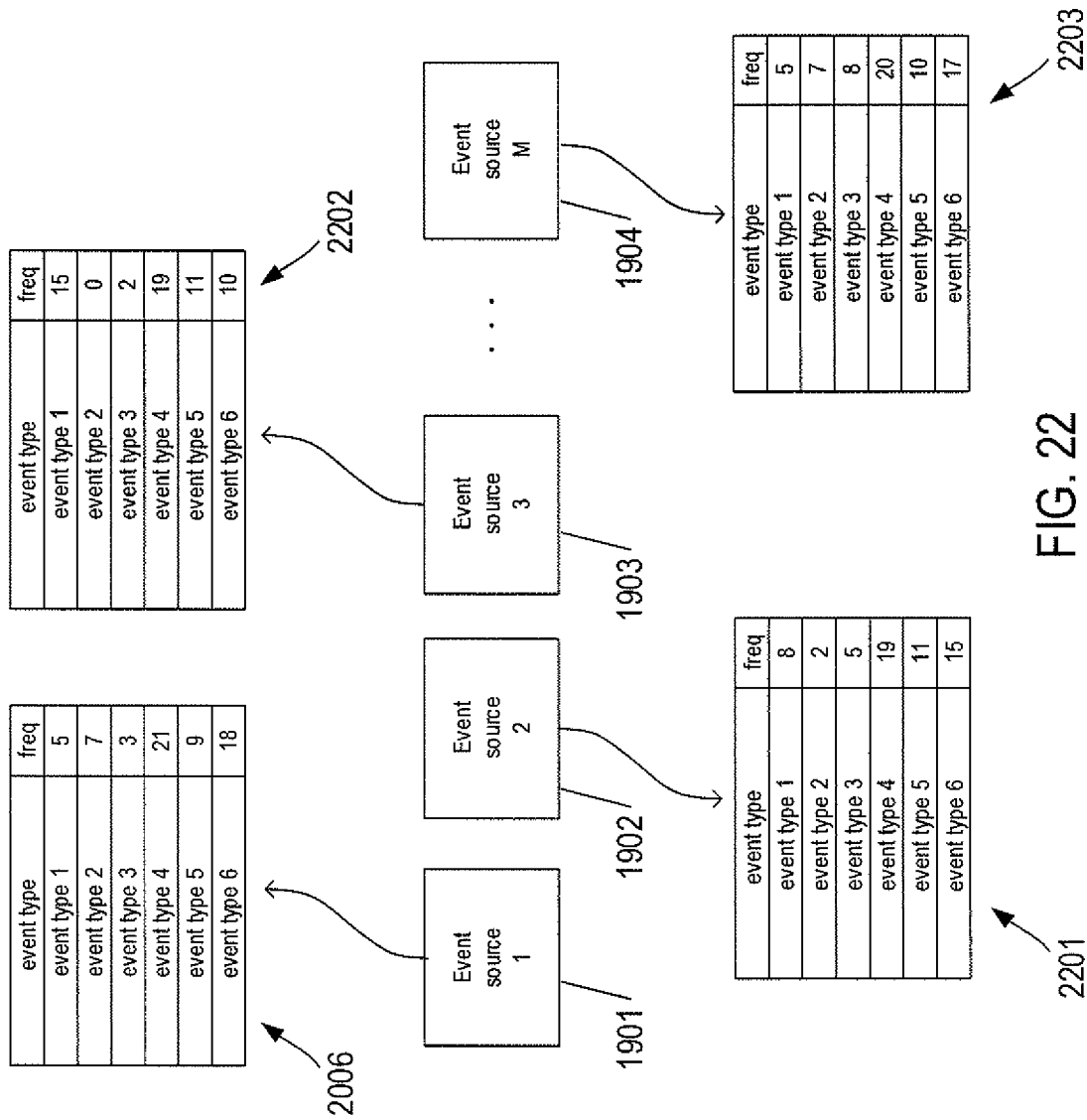
FIG. 22 shows an example of event sources and associated event-type logs.

FIG. 22 shows the event sources 1901-1904 and associated event-type logs 2006 and 2201-2203, respectively. In the example of FIG. 22, event-type logs 2006, 2201, and 2203 have similar frequencies for each of the six event types. However, the frequencies of the event types of the event-type log 2202 different from the frequencies of the event-type logs 2006, 2201, and 2203, which indicates that there may be a problem or future problem with the component 1913 that host the event source 1903 in FIG. 19. Methods described below are directed to determining the degree of similarity between the event sources based on the event-type logs.

In one implementation, the degree to which event-type logs of a set of event sources are similar, or alternatively dissimilar, from one another, the sets of frequencies of the different event types of each event-type log may be treated as N-dimensional vectors in an N-dimensional vector space, where N is the number of different event types of the event-type logs of the set of event sources. Consider a set of M event sources. Each event source has an associated event-type log of N different event types generated over the observation time window ΔT, as described above with reference to FIG. 22. Let an N-dimensional event-type frequency vector of an m-th event source, $ES_m$, be represented by:

$$V_m = ET_{1,m}^f, \ldots, ET_{n,m}^f, \ldots, ET_{N,m}^f \quad (1)$$

where
subscript m identifies the m-th event source in the set of M event sources m=1, ..., M;
$ET_{n,m}^f$ is the frequency of the "event type n" generated by the m-th event source in the observation time window $\Delta T$; and
subscript n is an event type index n=1, ..., N.

The sets of frequencies of the event types of the event sources 1901-1904 described above with reference to FIG. 22 may be represented as 6-dimensional vectors in a 6-dimensional vector space as follows: $V_1 = [5,7,3,21,9,18]$, $V_2 = [8,2,5,19,11,15]$, $V_3 = [4,6,4,22,9,17]$, and $V_M = [5,7,8,20,10,17]$.

The direction of event-type frequency vectors of event sources may not be identical because the event sources may be run on different components and may have different usages, but the directions of the associated event-type frequency vectors are expected to be similar. The degree of similarity between any two event-type frequency vectors may be quantitatively determined using cosine similarity. The cosine similarity between any two event-type frequency vectors $V_m$ and $V_k$ of two corresponding event sources, $E_{Sm}$ and $ES_k$, may be calculated as follows:

$$Sim_{CS}(m, k) = 1 - \frac{2}{\pi} \cos^{-1} \left[ \frac{\sum_{n=1}^{N} ET_{n,m}^f ET_{n,k}^f}{\sqrt{\sum_{n=1}^{N} (ET_{n,m}^f)^2} \sqrt{\sum_{n=1}^{N} (ET_{n,k}^f)^2}} \right] \quad (2)$$

The similarity, $Sim_{cs}(m, k)$, is calculated for each pair of event-type frequency vectors $V_m$ and $V_k$, where m=1, ..., M, k=2, ..., M and k>m. The similarity $Sim_{cs}(m, k)$ ranges between 0 and 1 (i.e., $0 \leq Sim_{cs}(m, k) \leq 1$). When the similarity $Sim_{cs}(m, k)$ equals 0 the event-type frequency vectors $V_m$ and $V_k$ are regarded as dissimilar. When the similarity $Sim(m, k)$ equals 1 the event-type frequency vectors $V_m$ and $V_k$ are pointing in the same direction and may be regarded as identical. The closer the value of the similarity $Sim_{cs}(m, k)$ is to 0 the more dissimilar the event-type frequency vectors $V_m$ and $V_k$ are to each other. The closer the value of the similarity $Sim_{cs}(m, k)$ is to 1 the more similar the event-type frequency vectors $V_m$ and $V_k$ are to each other.

Figure 23:
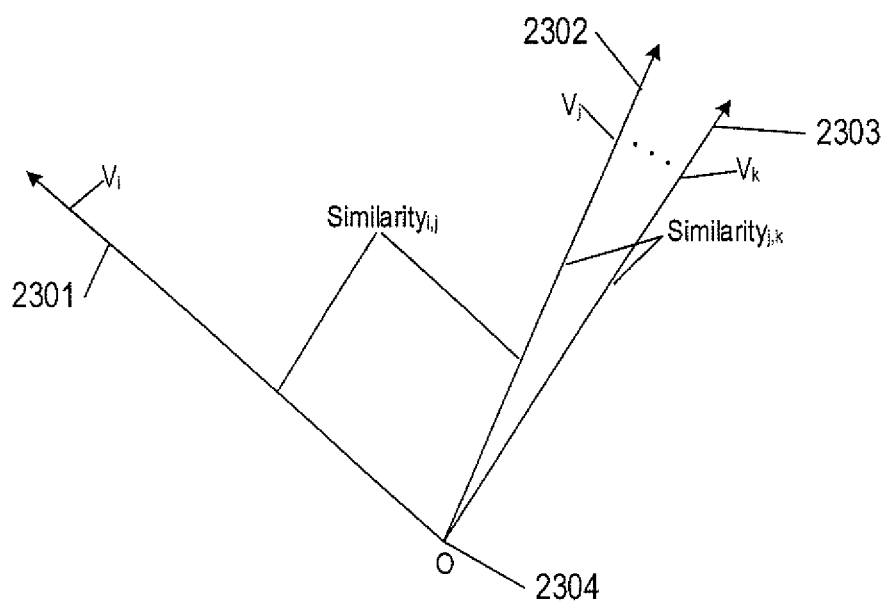
FIG. 23 shows a plot of three examples of event-type frequency vectors.

FIG. 23 shows an example of three event-type frequency vectors $V_i$, $V_j$, and $V_k$ represented by directional arrows 2301-2303. The event-type frequency vectors $V_i$, $V_j$, and $V_k$ emanate from an origin 2304 denoted by "O." The event-type frequency vectors $V_i$, $V_j$, and $V_k$ represent sets of event-type frequencies of three corresponding event sources $ES_i$, $ES_j$, and $ES_k$. In the example of FIG. 23, the event-type frequency vectors $V_j$ and $V_k$ point in approximately the same general direction while the event-type frequency vector $V_i$ points in a direction that is nearly orthogonal to the directions of the event-type frequency vectors $V_j$ and $V_k$. Equation (2) may be used to calculate a similarity, $Sim_{cs}(i,j)$, between the event-type frequency vectors $V_i$ and $V_j$ and calculate similarity, $Sim_{cs}(j, k)$, between the event-type frequency vectors $V_j$ and $V_k$. In the example of FIG. 23, because the event-type frequency vectors $V_j$ and $V_k$ point in the same general direction, the similarity $Sim_{cs}(j, k)$ is close to one.

On the other hand, because the event-type frequency vectors $V_j$ and $V_k$ are nearly orthogonal, the similarity $Sim_{cs}(i,j)$ is close to zero.

In other implementations, the similarity between pairs of event sources may be determined by measuring a difference between event-type probability distributions of two event sources. Event-type probability distributions may be determined as follows. Consider again the m-th event source of the set of M event sources described above with reference to Equation (I) in which each of the N event types occurs with an event-type frequency given by $$ET_{1,m}^f, \ldots, ET_{n,m}^f, \ldots, ET_{N,m}^f \quad (3)$$

where $ET_{N,m}^f$ is the frequency of the "event type n" generated by the m-th event source in the observation time window $\Delta T$. The probability of each event type may be calculated based on the frequency of each event type generated within the observation time window $\Delta T$ as follows:

$$P_{m,n} = \frac{ET_{n,m}^f}{ET_{TOT,m}} \text{ where} \quad (4a)$$

$$ET_{TOT,m} = \sum_{n=1}^{N} ET_{n,m}^f \quad (4b)$$

Consider a second k-th event source in the set of M event sources with event-type frequencies given by $$ET_{1,k}^f, \ldots, ET_{n,k}^f, \ldots, ET_{N,k}^f \quad (5)$$

where $ET_{n,k}^f$ is the frequency of the "event type n" generated by the k-th event source in the same observation time window $\Delta T$. The probabilities of each event type generated by the k-th event source may be calculated based on the frequencies of each event type generated over the observation time window $\Delta T$ as follows:

$$Q_{k,n} = \frac{ET_{n,k}^f}{ET_{TOT,m}} \text{ where} \quad (6a)$$

$$ET_{TOT,k} = \sum_{n=1}^{N} ET_{n,k}^f \quad (6b)$$

The probabilities of the N event types of the m-th event source may be used to form a probability distribution denoted by $\{P_{m,n}\}_{n=1}^{N}$. The probabilities of the N event types of the k-th event source may be used to form a probability distribution denoted by $\{Q_{k,n}\}_{n=1}^{N}$.

Figure 24:
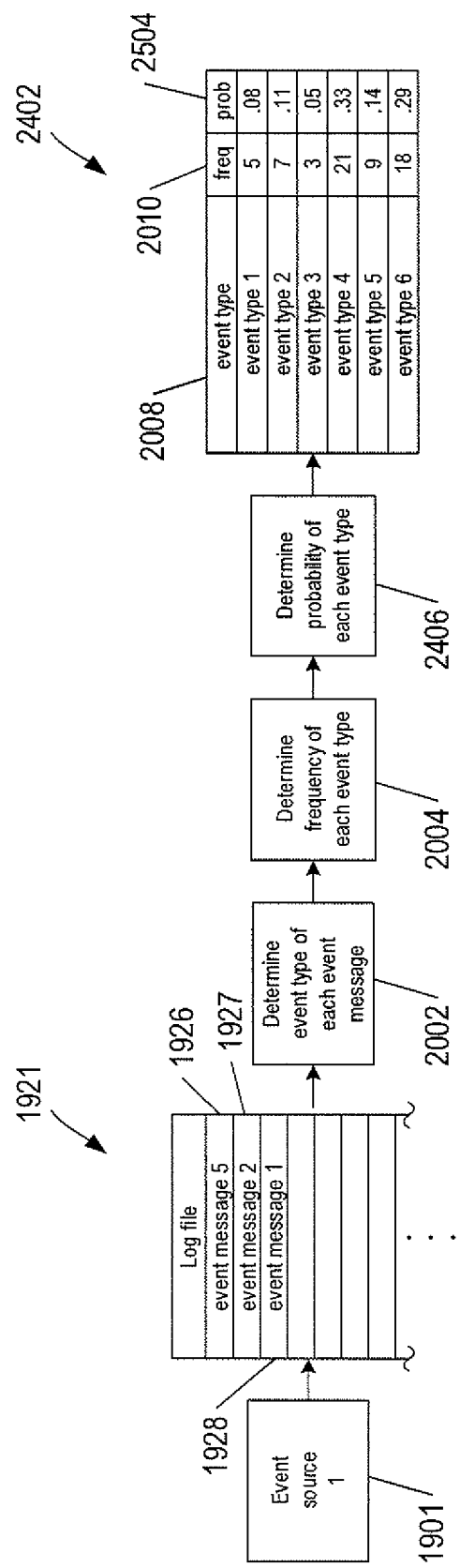
FIG. 24 shows an example of a method to determine an event-type log from an event log that includes event-type probabilities.

FIG. 24 shows an example of determining an event-type log 2402 of the event source 1 1901 that includes event-type probabilities. The event-type log 2402 list the six event types 2008 and the associated frequencies 2010 determined as described above with reference to FIG. 20. In block 2406, the probabilities of each event type is calculated as described above with reference to Equations (4) and (6). The event-type log 2402 includes a column 2404 of probabilities determined for each of the event types. The probabilities listed in column 2404 form the event-type probability distribution of the event source 1 1901.

Figure 25:
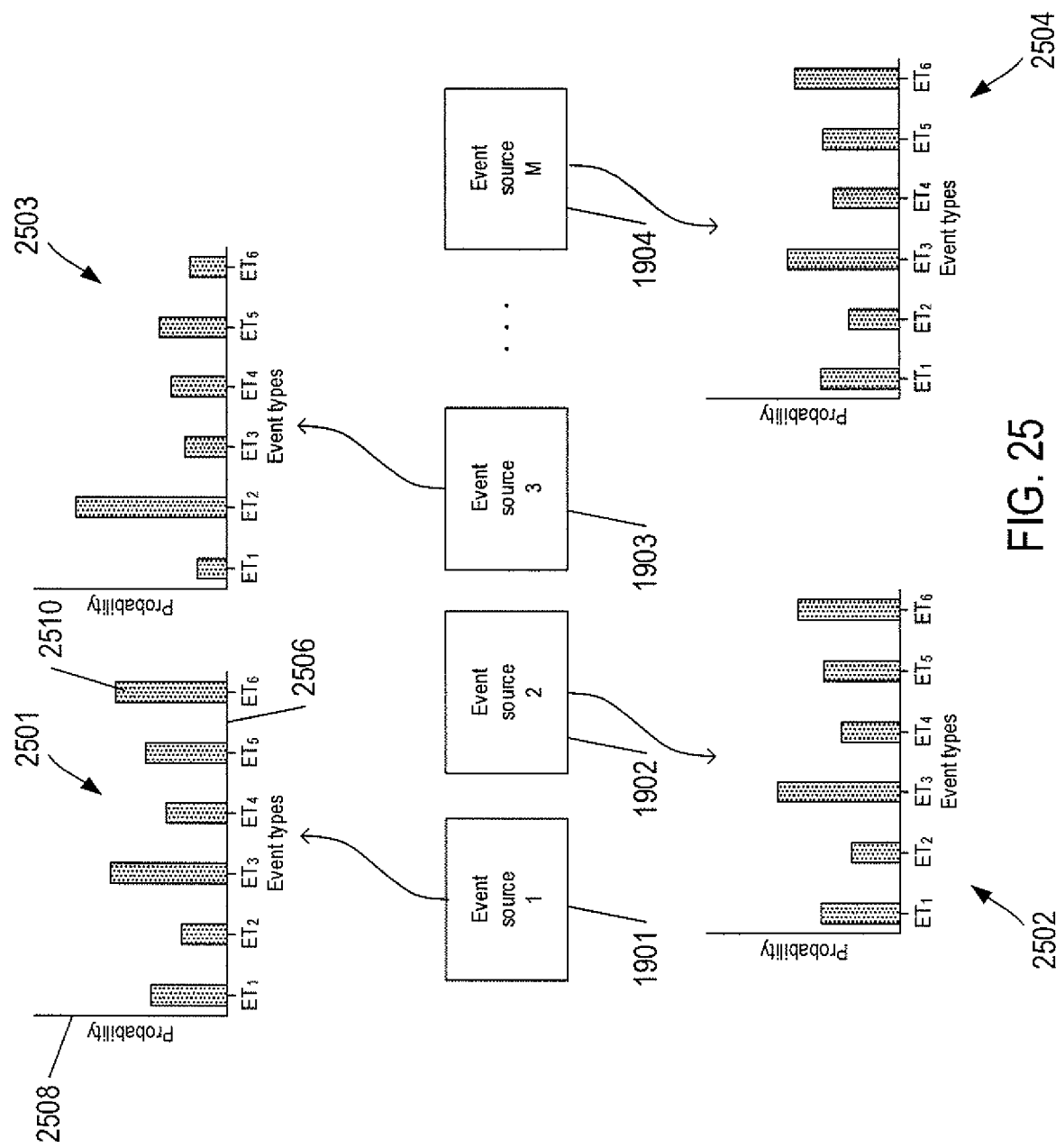
FIG. 25 shows an example of event sources and plots of associated probability distributions.

FIG. 25 shows the event sources 1901-1904 and plots of associated probability distributions 2501-2504. Horizontal axes, such as horizontal axis 2506 of probability distribution 2501, represent the six different event types denoted by $ET_1$, $ET_2$, $ET_3$, $ET_4$, $ET_5$, and $ET_6$. Vertical axes, such as vertical axis 2508 of the probability distribution 2501, represent of a range of probabilities. Bars represent the event-type probability of an event type. For example, bar 2510 represents the probability of the event type $ET_6$ occurring with the event source 1 1901. In the example of FIG. 25, the event-type probability distributions 2501, 2502, and 2504 appear similar while the event-type probability distribution 2503 appears dissimilar from the event-type probability distributions 2501, 2502, and 2504. Event-type logs 2006, 2301, and 2303 have similar frequencies for each of the six event types. However, the frequencies of the event types of the event-type log 2302 differ from the frequencies of the event-type logs 2006, 2301, and 2303, which may be indication of a problem or may be an indication of a future problem with the component 1913 that host the event source 1903. For example, the component 1913 may be identified for troubling shooting or monitoring.

In one implementation, the similarity between pairs of event sources may be measured using the cosine similarity between the event-type probability distributions of the two event sources as follows:

$$Sim_{CS}(m, k) = 1 - \frac{2}{\pi}\cos^{-1}\left[\frac{\sum_{n=1}^{N} P_{n,m}Q_{n,k}}{\sqrt{\sum_{n=1}^{N}(P_{n,m})^2}\sqrt{\sum_{n=1}^{N}(Q_{n,k})^2}}\right] \quad (7)$$

In another implementation, the similarity between pairs of event sources may be measured by calculating an information divergence, or relative entropy, between the event-type probability distributions of the two event sources as follows:

$$Sim_{ID}(m, k) = \sum_{n=1}^{N} P_{n,m}\log\left(\frac{P_{n,m}}{Q_{n,k}}\right) \quad (8)$$

In Equation (8) when $Q_{n,k}=0$ implies $P_{n,m}=0$ and $0 \log(0/0)=0$. The similarity $Sim_{ID}$ (m, k) is calculated for each pair of event sources, where m=1, ..., M, k=1, ..., M and k>m.

In still another implementation, the similarity between pairs of event sources may be measured by calculating a Jensen-Shannon divergence between the event-type probability distributions of two event sources as follows:

$$Sim_{JS}(m, k) = \quad (9)$$
$$-\sum_{n=1}^{N} M_n \log M_n + \frac{1}{2}\left[\sum_{n=1}^{N} P_{n,m}\log P_{n,m} + \sum_{n=1}^{N} Q_{n,k}\log Q_{n,k}\right]$$

where $M_n=(P_{n,m}+Q_{n,k})/2$.

The similarity $Sim_{JS}$ (m, k) is calculated for each pair of event sources, where m=1, ..., M, k=1, ..., M and k>m.

Figures 26A, 26B:
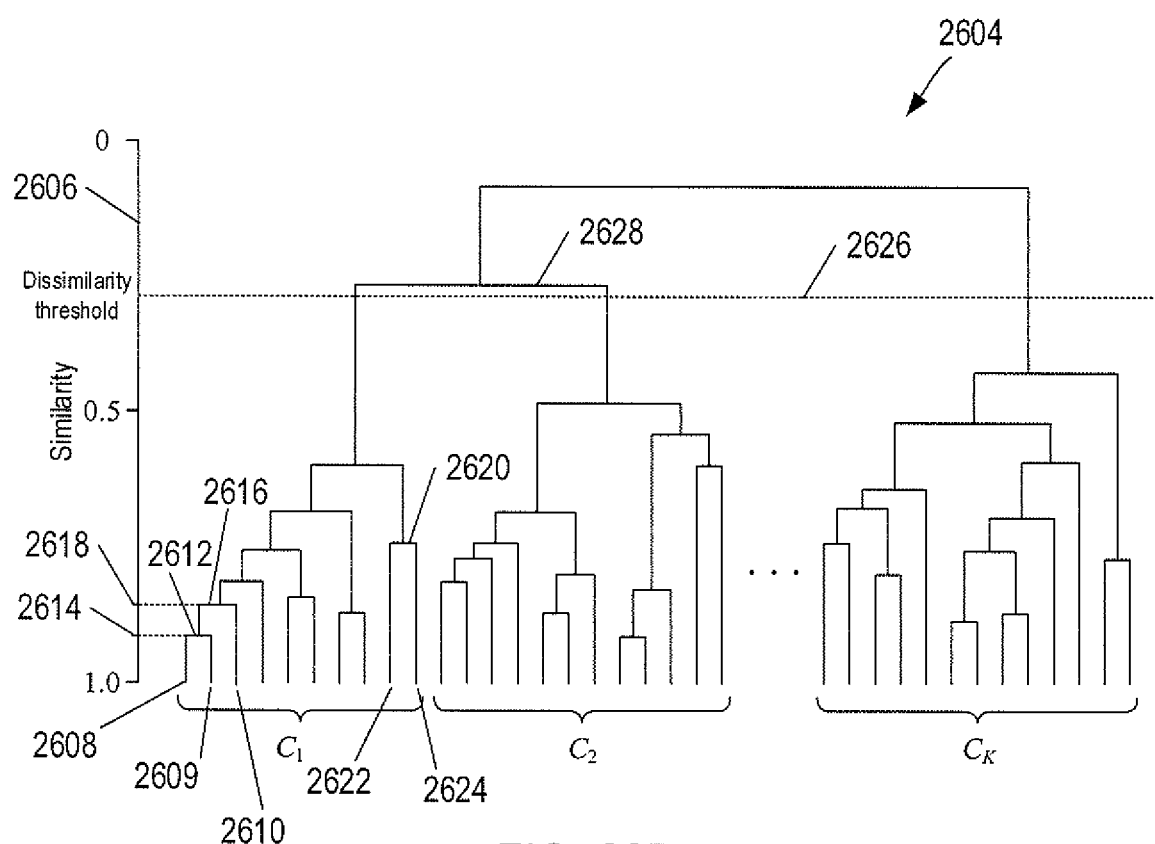
FIG. 26A shows an example similarity matrix.
FIG. 26B shows an example dendrogram constructed from similarities of pairs of event sources.

After a similarity has been calculated for each pair of event types using one of Equations (2), (7), (8), and (9), hierarchical clustering analysis may be used to identify clusters of event sources within the observation time window $\Delta T$ as follows. FIG. 26A shows an example similarity matrix 2600 of similarities calculated for each pair of M event sources denoted by $ES_1, ES_2, ..., ES_M$. The similarity matrix elements are denoted by Sim(m, k), where $1 \leq k$, $m \leq M$. For example, similarity matrix element Sim(2,3) 2602 represents the similarity calculated between event sources $ES_2$ and $ES_3$. The similarity matrix elements Sim(m, k) may be calculated for each pair of event sources using any one of the similarities described above with reference to Equations (2), (7), (8), and (9). For example, similarity matrix elements Sim(m, k) may represent cosine similarities $Sim_{CS}$ (m, k), the information divergence similarities $Sim_{ID}$ (m, k), or Jenson-Shannon similarities $Sim_{JS}$(m, k). Note that because Sim(m, k)=Sim(k, m) the similarity matrix 2600 is a symmetric matrix with only the upper diagonal matrix elements represented. The diagonal elements are equal to one because Sim(m, m)=1 for all in.

Hierarchical clustering analysis may be applied to the similarities in the similarity matrix 2600 using an agglomerative approach and maximum or complete linkage criterion in order to create a dendrogram of the event sources. A dendrogram is a branching tree diagram that represents a hierarchy of relationships of similarities between event sources. The resulting dendrogram may then be used to form clusters of event sources.

FIG. 26B shows an example dendrogram 2604 constructed from similarities of pairs of event sources. Vertical axis 1606 represents the range of similarity values between 0 and 1, where a similarity value of 1 represents identical event sources and a similarity value of 0 represents completely different or dissimilar event sources. The dendrogram 2604 is a branching tree diagram in which the ends of the dendrogram, called "leaves," represent the source elements. For example, leaves 2608-2610 represent three different event sources. The branches represent the similarities between the event sources. For example, the branch 2612 represents the similarity between the event sources 2608 and 2609, which corresponds to a similarity value 2614 on the similarity axis 2606. Branch 2616 represents the similarity between the event pair of event sources 2608 and 2609 and the event source 2610, which corresponds to the similarity value 2618 on the similarity axis 2606. The height or value of the branches represents a degree of similarity between event sources. In the example of FIG. 26B, the smaller the value of the branch point, the less similar (or more dissimilar) are the event sources at the ends of the branches. For example, because the similarity value 2614 is closer to one than the similarity value of the branch 2620, the event sources 2608 and 2609 have greater similarity to one another than the event sources 2622 and 2624.

A dissimilarity threshold may be used to separate or cut event sources into clusters. The dissimilarity threshold may be selected to obtain a desired clustering such that each of the resultant clusters satisfies a minimum similarity. Event sources connected by branch points that are less than the dissimilarity threshold are separated or cut into clusters. For example, in FIG. 26B, dashed line 2626 represents a dissimilarity threshold that corresponds to a minimum similarity. Event sources connected by branch point 2628 are less than the dissimilarity threshold 2626 (i.e., minimum similarity) are separated into event source clusters $C_1$ and $C_2$. In other words, event sources that are connected by branch points (i.e., similarities) that are greater than the dissimilarity threshold 2626 (i.e., minimum similarity) form event source clusters.

Figures 27A, 27B:
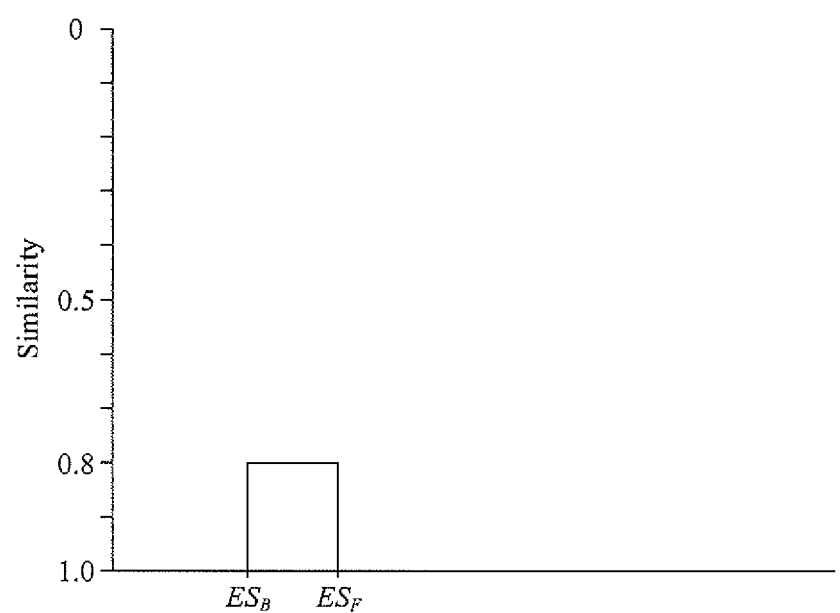
Figures 27C, 27D:
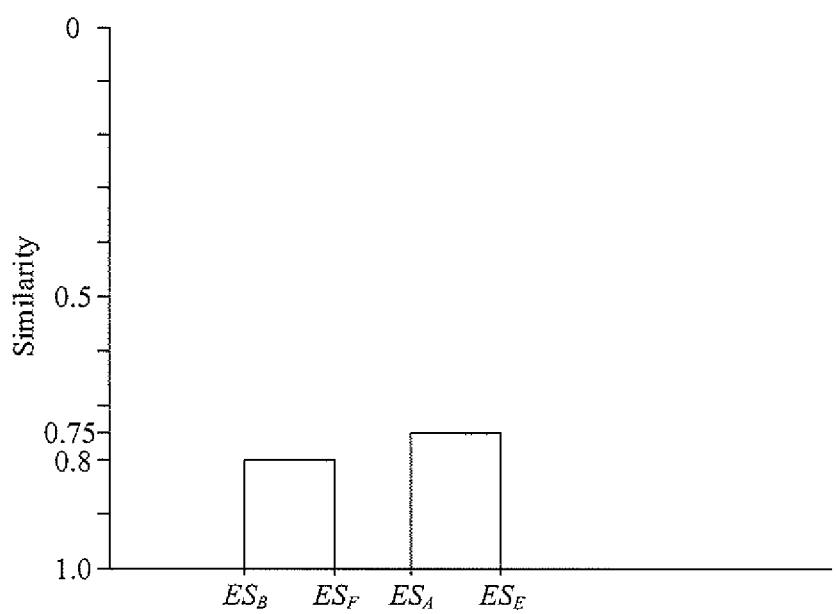
Figures 27E, 27F:
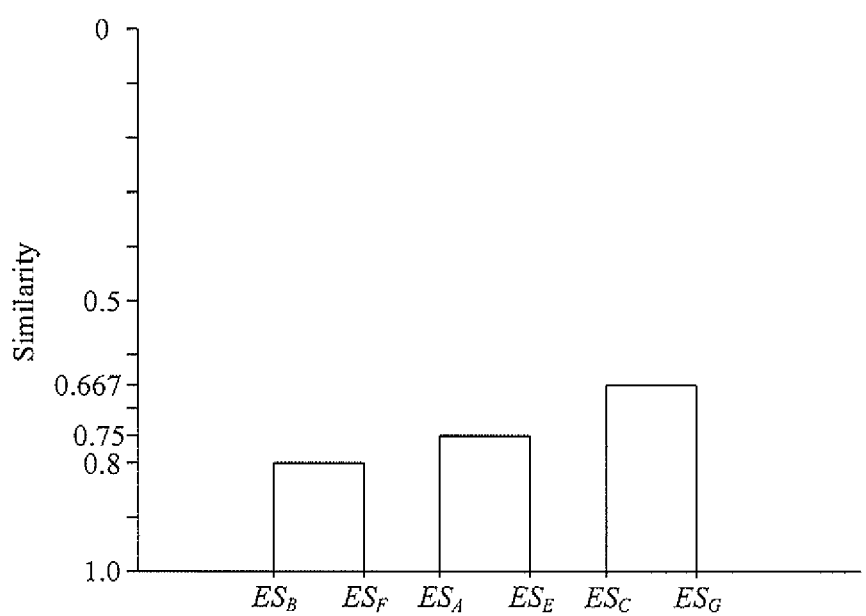
Figures 27G, 27H:
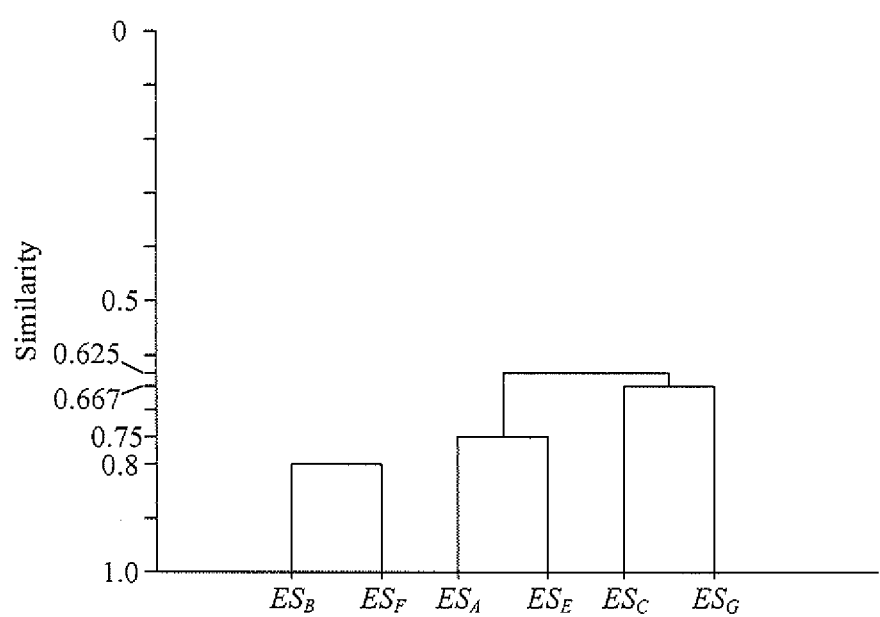
Figures 27I, 27J:
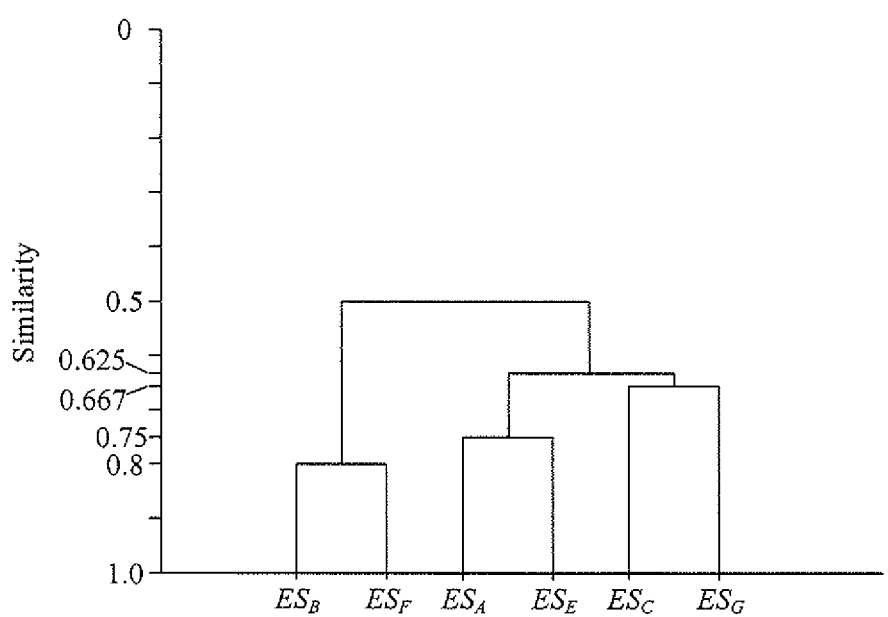

FIGS. 27A-27L show an example of hierarchical clustering applied to a set of seven event sources using maximum linkage criterion. The event sources are denoted by $ES_A$, $ES_B$, $ES_C$, $ES_D$, $ES_E$, $ES_F$, and $ES_G$. FIG. 27A shows an example similarity matrix of similarities calculated for each pair of the seven event sources. An initial step in hierarchical clustering is identifying the pair of event sources that are the most similar. In the example of FIG. 27A, event sources $ES_B$ and $ES_F$ have the largest similarity value of 0.8. In FIG. 27B, the two event sources $ES_B$ and $ES_F$ are the first two leaves of a dendrogram and are joined at the similarity level 0.8. After the pair of event sources have been linked, a reduced similarity matrix is formed in FIG. 27C. The two event sources $ES_B$ and $ES_F$ are removed from the similarity matrix in FIG. 27C and the linked event sources ($ES_B$, $ES_F$) is introduced. The maximum linkage criterion may be used to determine the similarities between the linked event sources ($ES_B$, $ES_F$) and the other event sources that appear as elements along the row 2702. The similarity at each element of the row 2702 is the maximum of the events source in the linked event sources with each of the remaining event sources. For example, the similarity between $ES_B$ and $ES_C$ is 0.296 and the similarity between $ES_F$ and $ES_C$ is 0.333 as revealed by the corresponding matrix elements in FIG. 27A. The maximum of the two similarities is 0.333. Therefore the similarity between the linked event sources ($ES_E$, $ES_F$) and the event source $ES_C$ is 0.333 as represented by the matrix element 2704. The remaining elements in the row 2702 are determined in the same manner. The largest similarity in the similarity matrix of FIG. 27C is 0.75. In FIG. 27D, the two event sources $ES_A$ and $ES_E$ are two more leaves in the dendrogram and are joined at the similarity level 0.75. The rows associated with the event sources $ES_A$ and $ES_E$ are removed from the similarity matrix shown in FIG. 27E and the maximum linkage criterion is repeated for the linked event sources ($ES_A$, $ES_E$) in order to obtain the similarities in the row 2706 in FIG. 27E. For example, the similarity between ($ES_B$, $ES_F$) and $ES_A$ is 0.5 and the similarity between ($ES_E$, $ES_E$) and $ES_E$ is 0.333 as revealed by the corresponding matrix elements in FIG. 27C. The maximum of the two similarities is 0.5 as represented by the matrix element 2708. The remaining elements in the row 2706 are determined in the same manner. The largest similarity in the similarity matrix of FIG. 27E is 0.667. In FIG. 27F, the two event sources $ES_C$ and $ES_G$ are two more leaves of the dendrogram and are joined at the similarity level 0.667. FIGS. 27G-27L show similarity matrices and corresponding dendrograms constructed using the maximum linkage criterion at each step. FIG. 27L shows the final dendrogram.

FIG. 27L also shows dashed line 2701 that represents a dissimilarity threshold at 0.60. In other words, the dissimilarity threshold of 0.60 is a minimum similarity. Event sources with similarities greater than the minimum similarity of 0.60 form a cluster. For example, the events sources $ES_E$ and $ES_F$ have a similarity of 0.8, and the event sources $ES_A$, $ES_E$, $ES_C$, and $ES_C$ have similarities that are greater than 0.6. But the events sources $ES_E$ and $ES_F$ have a similarity of 0.5 with the event sources $ES_A$, $ES_E$, $ES_C$, and $ES_C$, which is less than the minimum similarity of 0.60. Therefore, the event sources $ES_E$ and $ES_F$ form an event source cluster $C_1$ and the event sources $ES_A$, $ES_E$, $ES_C$, and $ES_C$ form a different event source cluster $C_2$. Because the event source $ES_D$ has a similarity of 0.25 with the event sources in the event source clusters $C_1$ and $C_2$, event source is in single element cluster $C_3$.

In other implementations, average linkage criterion or minimum linkage criterion may be used in place of the maximum linkage criterion. For example, returning to FIG. 27C, the similarity at each element of the row 2702 may be calculated as the average of the events source in the linked event sources ($ES_B$, $ES_F$) with each of the remaining event sources. In particular, the similarity between $ES_B$ and $ES_C$ is 0.296 and the similarity between $ES_F$ and $ES_C$ is 0.333 as revealed by the corresponding matrix elements in FIG. 27A. The average of these two similarities is 0.315. Therefore the similarity between the linked event sources ($ES_B$, $ES_F$) and the event source $ES_C$ is 0.315. The remaining elements in the row 2702 are determined in the same manner. The similarity at each element of the row 2702 may be calculated as the minimum of the events source in the linked event sources ($ES_B$, $ES_F$) with each of the remaining event sources. In particular, the similarity between $ES_B$ and $ES_C$ is 0.296 and the similarity between $ES_F$ and $ES_C$ is 0.333 as revealed by the corresponding matrix elements in FIG. 27A. The minimum of these two similarities is 0.296. Therefore the similarity between the linked event sources ($ES_B$, $ES_F$) and the event source $ES_C$ is 0.296. The remaining elements in the row 2702 are determined in the same manner.

After the clusters of event sources have been determined, a local outlier factor ("LOF") is calculated for each event source in each event source cluster. The LOF assigned to each event source in an event source cluster is a degree or measure of each event source being an outlier with respect to other event sources in the same cluster. The LOF is local in that the degree (i.e., value of the LOF) depends on how isolated an event source is with respect to a surrounding neighborhood of event sources. In other words, only a restricted neighborhood of each event source is taken into account to calculate the LOF of each event source.

Consider an event source cluster represented by $$C = \{ES_1, \ldots, ES_P\} \qquad (10)$$

The event source cluster may have been generated using hierarchical clustering analysis as described above. In order to calculate a LOF for each event source in the event source cluster C, the distance is calculated between each pair of event sources in the cluster C. The distance may calculated using $$dist(ES_p, ES_q) = \frac{2}{\pi} \cos^{-1} \left[ \frac{\sum_{n=1}^{N} ET_{n,p}^f ET_{n,q}^f}{\sqrt{\sum_{n=1}^{N} (ET_{n,p}^f)^2} \sqrt{\sum_{n=1}^{N} (ET_{n,q}^f)^2}} \right] \qquad (11)$$

where
  $ES_p$ and $ES_q$ are event sources in the event source cluster C;
  $\{ET_{n,p}^f\}_{n=1}^{N}$ is the set of event-type frequencies of the event source $ES_p$; and
  $\{ET_{n,q}^f\}_{n=1}^{N}$ is the set of event-types frequencies of the event source $ES_q$.

In other implementations, event-type probability distributions $\{P_{m,n}\}_{n=1}^{N}$ and $\{Q_{k,n}\}_{n=1}^{N}$ calculated in corresponding Equations (4) and (6) above may be used in Equation (11) in place of the event-type frequencies $\{ET_{n,p}^f\}_{n=1}^{N}$ and $\{ET_{n,q}^f\}_{n=1}^{N}$, respectively. In still other implementations, the distance may be calculated using $dist(ES_p, ES_q) = 1 - Sim_{JD}(m, k)$ or using $dist(ES_p, ES_q) = 1 - Sim_{JS}(m, k)$.

For each event source $ES_p$ in the event source cluster C, the distances are rank ordered and the k-th nearest neighbor distance, also called the k-distance, is determined and denoted by $dist_k(ES_p)$, where k is natural number. For example, consider the following distances in increasing order $dist(ES_A, ES_B)$, $dist(ES_A, ES_C)$, $dist(ES_A, ES_D)$, and $dist(ES_A, ES_E)$, where $ES_A$, $ES_B$, $ES_C$, $ES_D$, and $ES_E$ represent event sources in the same cluster. The second (i.e., k=2) nearest neighbor distance of the event source $ES_A$ is $dist_2(ES_A)=dist(ES_A, ES_C)$.

Given the k-distance of each event source $ES_p$ in the cluster C, a k-distance neighborhood of the event source $ES_p$ is a set of event sources of the cluster C with a distance from the event source $ES_p$ that is less than or equal to the k-distance of the event source $ES_p$:

$$N_k(ES_p)=\{ES_q \in C\backslash\{ES_p\} | dist(ES_p, ES_q) \leq dist_k(ES_p)\} \quad (12)$$

In the example above, the 2-distance neighborhood of the event source $ES_A$ is the set $N_2(ES_A)=\{ES_B, ES_C\}$ A local reachability density is calculated for each event source $ES_p$ in C as follows:

$$lrd_k(ES_p) = \frac{\|N_k(ES_p)\|}{\sum_{ES_q \in N_k(ES_p)} reach-dist_k(ES_p, ES_q)} \quad (13)$$

where
$\|N_k(ES_p)\|$ is the number of event sources in the k-distance neighborhood $N_k(ES_p)$; and
reach–$dist_k(ES_p, ES_q)$ is the reachability distance of the event source $ES_p$ to the event source $ES_q$.
The reachability distance is given by $$reach-dist_k(ES_p, ES_q)=\max\{dist_k(ES_p), dist(ES_p, ES_q)\} \quad (14)$$

An LOF is calculated for each event source $ES_p$ in C as follows:

$$LOF_k(ES_p) = \frac{\sum_{ES_q \in N_k(ES_p)} \frac{lrd_k(ES_q)}{lrd_k(ES_p)}}{\|N_k(ES_p)\|} \quad (15)$$

An LOF of the event source $ES_p$ calculated according to Equation (15) is an average local reachability density of the neighboring event sources divided by the event sources local reachability density. An LOF of about 1 indicates that the event source is comparable to the neighboring event sources and is not an outlier. An LOF value less the 1 indicates that the event source is part of a dense event source region (i.e., event sources are close together). An LOF value of an event source that significantly larger than 1 is an outlier. For example, an event source $ES_p$ in C is identified as an outlier when the corresponding LOF satisfies the following condition:

$$LOF_k(ES_p) \geq Th_{LOF} > 1 \quad (15)$$

where $Th_{LOF}$ is a LOF threshold.
For example, the LOF threshold $Th_{LOF}$ may be set equal to 1.5, 1.6, 1.7, 1.8, 1.9, or 2, or may be set to any suitable number greater than 2. The component of a distributed computing system used to host an event source with a local outlier factor greater than the local outlier factor threshold may be identified for management purposes, such as identified as having problems that may be more closely investigated or monitored during troubleshooting.

The method described below with reference to FIGS. 28-31 may be stored in one or more data-storage devices as machine-readable instructions that when executed by one or more processors of the computer system shown in FIG. 1 identifies anomalous behaving components of a distributed computing system.

Figure 28:
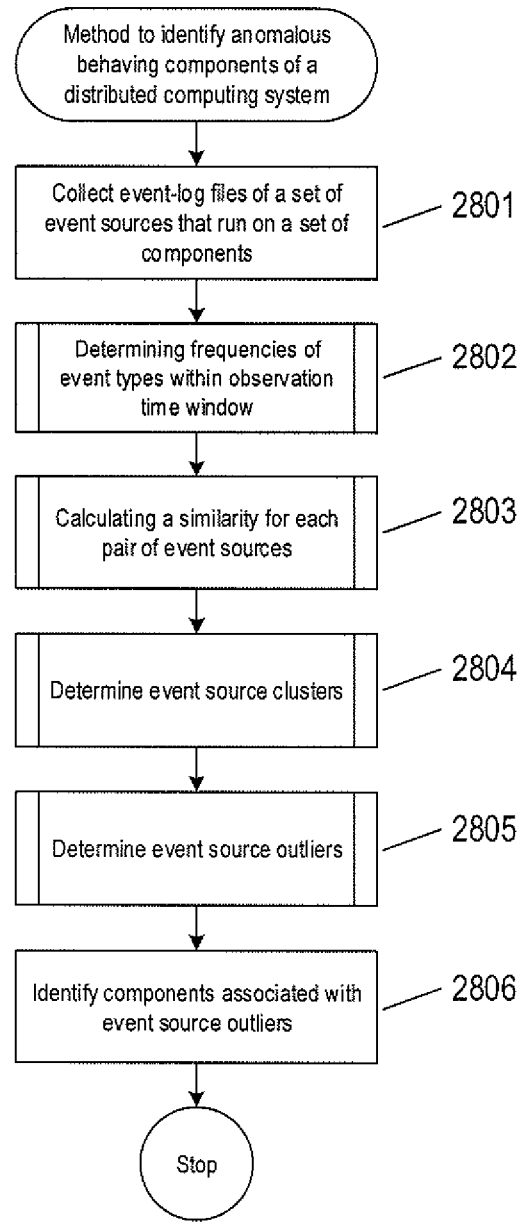
FIG. 28 shows a control-flow diagram of a method to identify anomalous behaving components of a distributed computing system.

FIG. 28 shows a control-flow diagram of a method to identify anomalous behaving components of a distributed computing system. In block 2801, event logs generated by a set of event sources that are run on a set of components are collected within an observation time window $\Delta T$. The set of event sources may be copies of the same application program, operating system, VM, or machine code running on the set of components. In block 2802, a routine "determine frequencies of event types within the observation window" is called to determine the frequencies of each of event types of the event logs. In block 2803, a routine "calculate a similarity for each pair of event sources" is called. In block 2804, a routine "determine event source clusters" is called to determine clusters of event sources using hierarchy analysis. In block 2805, a routine "determine event source outliers" is called to determine event source outliers in each event source cluster as described above with reference to Equations (10)-(16). In block 2806, components that run the event sources outliers may be identified for management purposes, such as, but not limited to, identified for troubleshooting, identified as having problems or issues, or may be identified for monitoring in case of future problems. An example of a future problem is corruption to a data-storage device, such hard disk drives or solid state drives.

Figure 29:
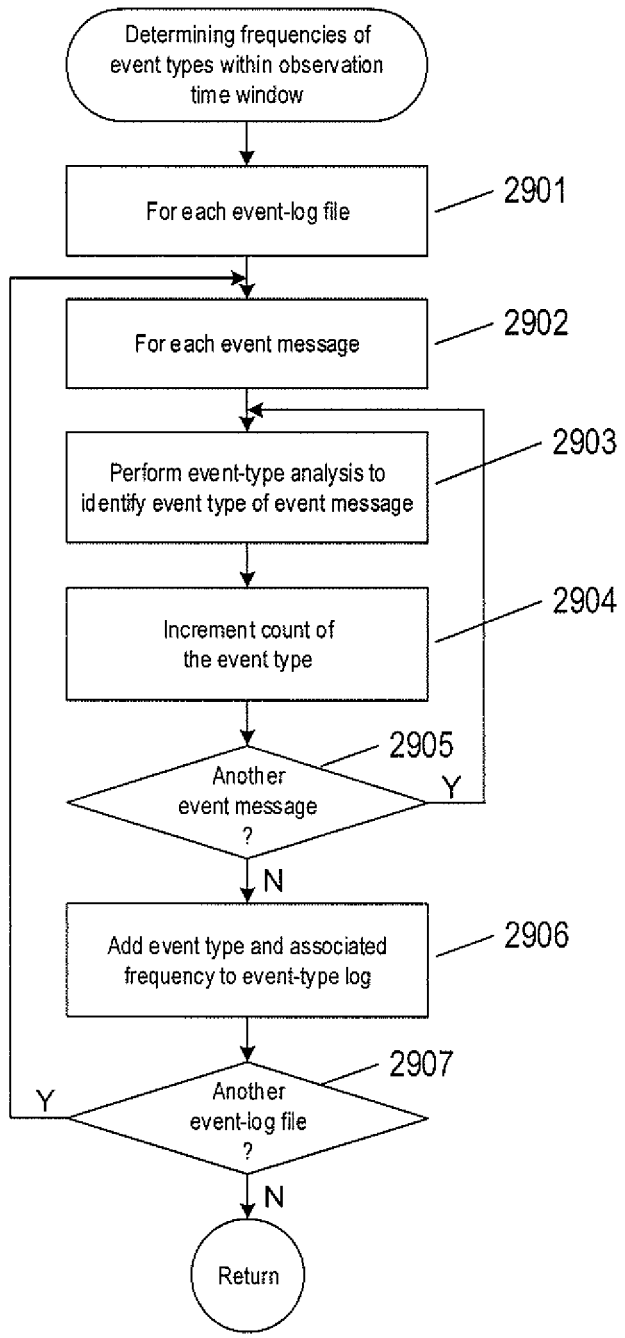
FIG. 29 shows a control-flow diagram of the routine "determine frequencies of event types within the observation window" called in FIG. 28.

FIG. 29 shows a control-flow diagram of the routine "determine frequencies of event types within the observation window" called in block 2802 of FIG. 28. A loop beginning with block 2901 repeats the operations represented by blocks 2902-2907 for each event log. A loop beginning with block 2902 repeats the operations represented by block 2903-2904 for each event message of an event log. In block 2903, event-type analysis is performed on event message in order to determines the non-parametric tokens of the event message the non-parametric tokens identify the event type of the event message, as described above with reference to FIG. 20. In block 2904, the count associated with the event type determined in block 2903 is incremented. In decision block 2905, the operations represented by blocks 2903 and 2904 are repeated for each event message of the event log. In block 2906, the event types and associated frequencies of the event types are added to an event-type log or other meta-data structure, as described above with reference to FIG. 20. In decision block 2907, the operations represented by blocks 2902-2906 are repeated for another event log.

Figure 30:
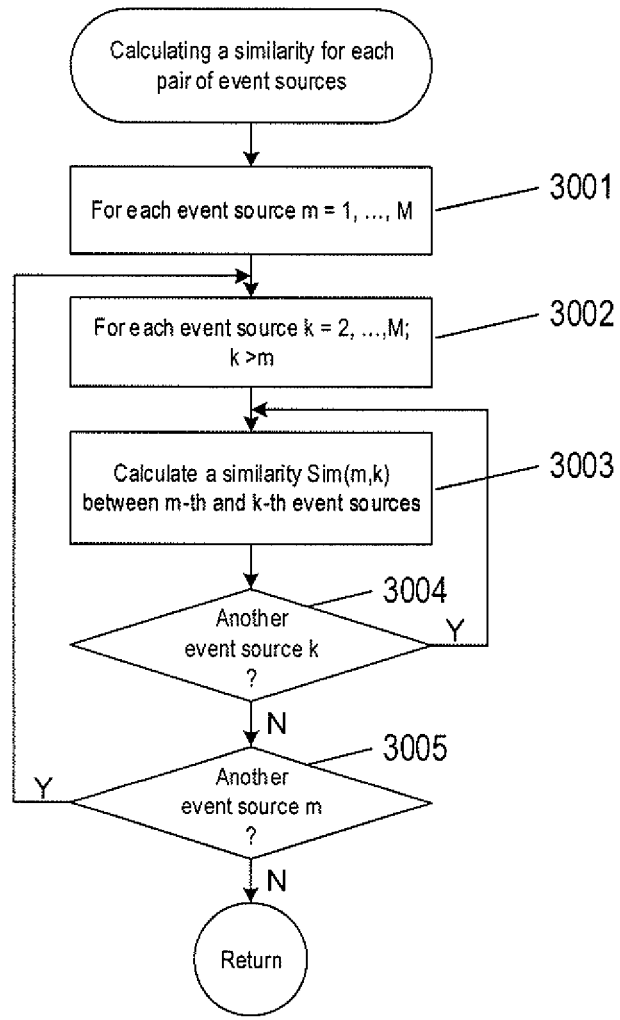
FIG. 30 shows a control-flow diagram of the routine "calculate a similarity for each pair of event sources" called in FIG. 28.

FIG. 30 shows a control-flow diagram of the routine "calculate a similarity for each pair of event sources" called in block 2803 of FIG. 28. A loop beginning with block 3001 repeats the operations represented by blocks 3002-3005 for each event source indexed m=1, . . . , M. A loop beginning with block 3002 repeats the operations represented by block 3003-3004 for each event message of an event log k=1, . . . ,M with the restriction that k>m in order to avoid repeats. In block 3003, a similarity is calculated for an event source In and an event source k. In certain implementations, the similarity may be calculated as described above with reference to Equations (1) and (2). In other implementations, the similarity may be calculated as described above with reference to Equations (3)-(7). In other implementations, the similarity may be calculated as described above with reference to Equations (3)-(6) and (8). In still other implementations, the similarity may be calculated as described above with reference to Equations (3)-(6) and (9). In decision block 3004, the operation of block 3003 is repeated for another event source k. Otherwise, control flows to decision block 3005 in which the operations of blocks 3002-3004 are repeated for another event source m.

Figure 31:
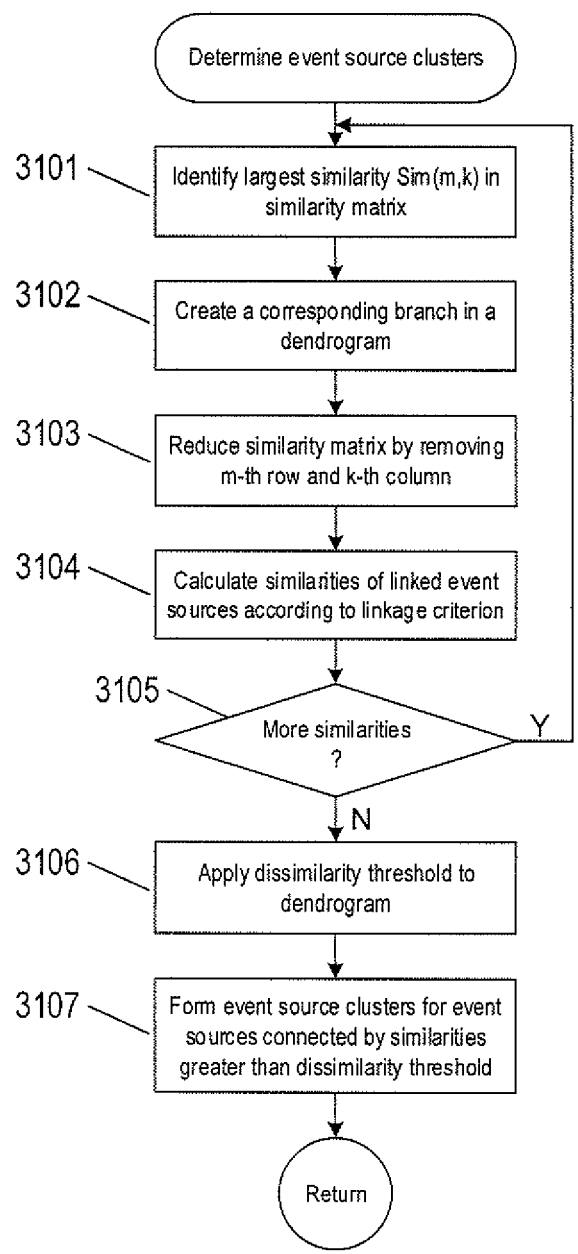
FIG. 31 shows a control-flow diagram of the routine "determine event source clusters" called in FIG. 28.

FIG. 31 shows a control-flow diagram of the routine "determine event source clusters" called in block 2804 of FIG. 28. In block 3101, the largest similarity in a similarity matrix is identified as described above with reference to FIG. 27A. In block 3102, a corresponding branch in a dendrogram is created. The branch has the associated similarity in a range of similarities as described above with reference to FIG. 27B. In block 3102, the similarity matrix is reduced by removing the m-th row and k-th column that correspond to the event sources with the largest similarity in the similarity matrix. In block 3104, similarities a linked event source comprising the event source of with largest similarity are calculated using one of the linkage criterion. For example, the linkage criterion may be the maximum linkage criterion described above with reference to FIG. 27C. In other implementations, the linkage criterion may be the average linkage criterion described above. In still other implementations, the linkage criterion may be the minimum linage criterion describe above. In decision block 3105, the computational operations represented by blocks 3101-3104 may be repeated the reduced similarity matrix obtained in block 3103. In block 3106, a dissimilarity threshold is applied to the dendrogram created from blocks 3101-3105. In block 3107, event source clusters are formed for event sources connected by similarities that are greater than the dissimilarity threshold, as described above with reference to FIGS. 26B and 27L.

Figure 32:
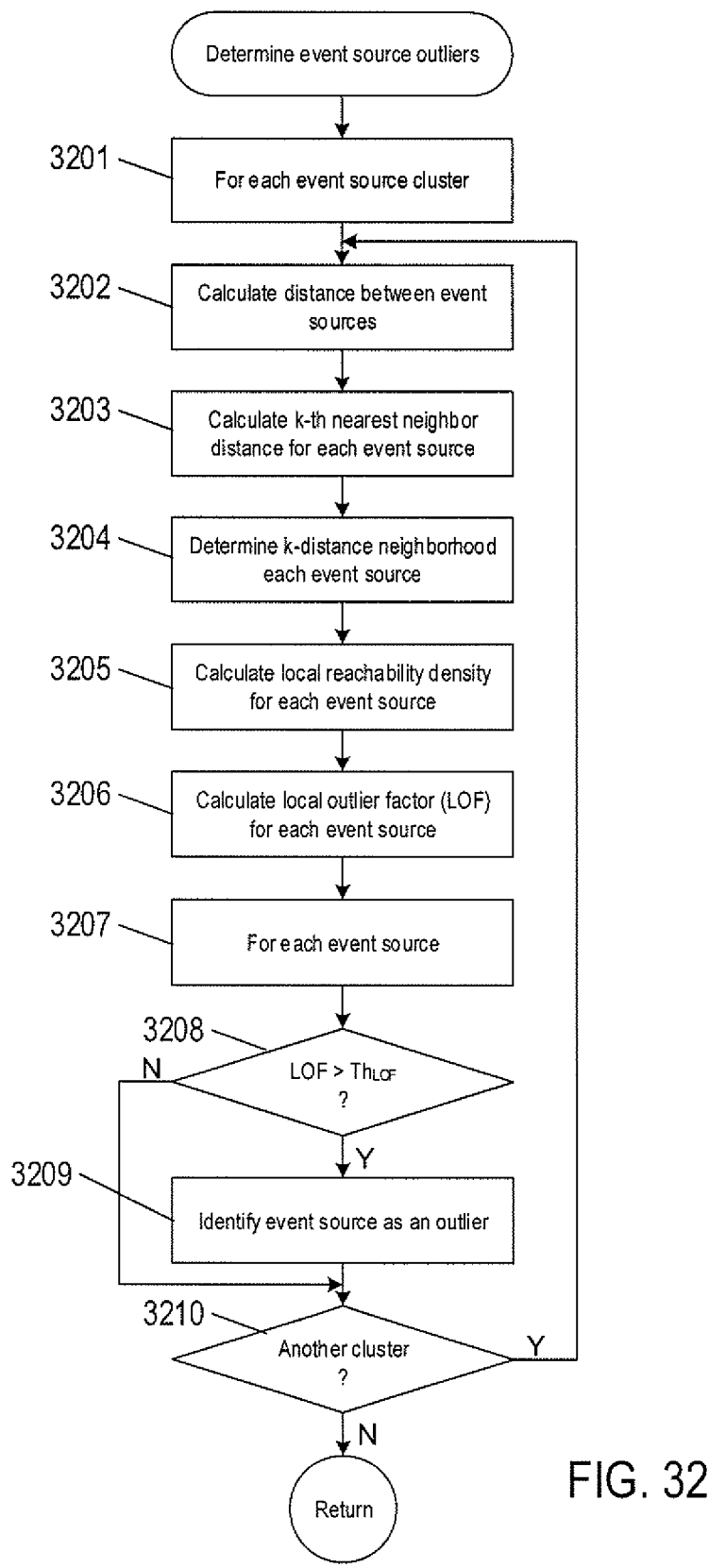
FIG. 32 shows a control flow diagram of the routine "determine event source outliers" called in FIG. 28.

FIG. 32 shows a control flow diagram of the routine "determine event source outliers" called in block 2805 of FIG. 28. A loop beginning with block 3201 repeats the operations represented by blocks 3202-3209 for each of the event source clusters determined in the routine "determine event source clusters" of FIG. 31. In block 3202, a distance is calculated between each pair of event sources according to Equation (11). In block 3203, a k-th nearest neighbor distance is calculated for each event source in the event source cluster as described above. In block 3204, a k-distance neighborhood is determined for each event source based on the k-th nearest neighbor distance of the event source, as described above with reference to Equation (12). In block 3205, a local reachability density is calculated for each event source in the event source cluster, as described above with reference to Equations (13) and (14). In block 3206, an LOF is calculated for each event source in the event source cluster as described above with reference to Equation (15). In decision block 3208, when the LOF calculated in block 3206 is greater than an LOF threshold as described above with reference to Equation (16) control flows to block 3209 where the corresponding event source is identified as an event source outlier. In decision block 3210, the operations represented by blocks 3202-3209 are repeated for another event source cluster.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A method stored in one or more data-storage devices and executed using one or more processors of a computer system to identify anomalous behaving components of a distributed computing system, the method comprising:
    collecting event messages generated by event sources within an observation time window, the event sources hosted by a number of the components of the distributed computing system;
    determining frequencies of event types of the event messages within the observation time window;
    calculating a similarity for each pair of event sources based on the frequencies of the event types;
    determining event source clusters based on the similarities determined for each pair of event sources;
    determining a local outlier factor for each event source of each event source cluster;
    identifying anomalously behaving components of the set of components that host the event sources when a corresponding local outlier factor is greater than a local outlier factor threshold; and
    migrating virtual machines from one or more server computers having the anomalously behaving components to one or more server computers having normal behaving components.

2. The method of claim 1, wherein the event sources are copies of the same type of event source running on the components.

3. The method of claim 1, wherein determining frequencies of event types within the observation time window comprises:
    determining an event type of each event message recorded within the observation time window using event type analysis; and
    counting a number of times each event type occurs within the observation time window, the number of each event type being the frequency of the event type.

4. The method of claim 1, wherein calculating the similarity for each pair of event sources comprises:
    identifying frequencies of event types of a first event source of the pair of event sources as a first event-type frequency vector;
    identifying frequencies of event types of a second event source of the pair of event sources as a second event-type frequency vector; and
    calculating a similarity between the first and second event-type frequency vectors, the similarity being a measure of closeness between the pair of event sources.

5. The method of claim 1, where calculating the similarity for each pair of event sources comprises:
    calculating a first probability distribution of the frequencies of event types generated by a first event source of the pair of event sources;
    calculating a first probability distribution of frequencies of event types generated by a second event source of the pair of event sources; and
    calculating an information divergence between the first probability distribution and the second probability distribution, the information divergence being a measure of the similarity between the pair of event sources.

6. The method of claim 1, where calculating the similarity for each pair of event sources comprises:
    calculating a first probability distribution of the frequencies of event types generated by a first event source of the pair of event sources;
    calculating a first probability distribution of frequencies of event types generated by a second event source of the pair of event sources; and
    calculating a Jensen-Shannon divergence between the first probability distribution and the second probability distribution, the Jensen-Shannon divergence being a measure of the similarity between the pair of event sources.

7. The method of claim 1, wherein determining the event source clusters comprises:
applying hierarchical clustering analysis to the similarities of event sources in order to generate a dendrogram of the event source similarities; and
forming the event source clusters for event sources connected by similarities that are greater than a dissimilarity threshold.

8. The method of claim 1, wherein determining the local outlier factor for each event source of each the event source cluster comprises:
calculating a distance between each pair of the event sources in the event source cluster;
calculating a k-th nearest neighbor distance for event source of the event source cluster;
determining a k-distance neighborhood for each event source of the event source cluster based on the k-th nearest neighbor distance of each event source;
calculating a local reachability density for each event source based on the k-distance neighborhood of each event source;
calculating a local outlier factor for each event source based on the local reachability density of event sources within the k-distance neighborhood; and
identifying an event source in the event source cluster as an event source outlier when the local outlier factor of the event source is greater than the local outlier factor threshold.

9. A system to identify anomalous behaving components of a distributed computing system, the system comprising:
one or more processors;
one or more data-storage devices; and
machine-readable instructions stored in the one or more data-storage devices that when executed using the one or more processors controls the system to carry out
collecting event messages generated by event sources within an observation time window, the event sources hosted by a number of the components of the distributed computing system;
determining frequencies of event types of the event messages within the observation time window;
calculating a similarity for each pair of event sources based on the frequencies of the event types;
determining event source clusters based on the similarities determined for each pair of event sources;
determining a local outlier factor for each event source of each event source cluster;
identifying anomalously behaving components of the set of components that host the event sources when a corresponding local outlier factor is greater than a local outlier factor threshold; and
migrating virtual machines from one or more server computers having the anomalously behaving components to one or more server computers having normal behaving components.

10. The system of claim 9, wherein the event sources are copies of the same type of event source running on the components.

11. The system of claim 9, wherein determining frequencies of event types within the observation time window comprises for each event log generated by one of the event sources,
determining an event type of each event message recorded within the observation time window using event type analysis; and
counting a number of times each event type occurs within the observation time window, the number of each event type being the frequency of the event type.

12. The system of claim 9, wherein calculating the similarity for each pair of event sources comprises:
identifying frequencies of event types of a first event source of the pair of event sources as a first event-type frequency vector;
identifying frequencies of event types of a second event source of the pair of event sources as a second event-type frequency vector; and
calculating a similarity between the first and second event-type frequency vectors, the similarity being a measure of closeness between the pair of event sources.

13. The system of claim 9, where calculating the similarity for each pair of event sources comprises:
calculating a first probability distribution of the frequencies of event types generated by a first event source of the pair of event sources;
calculating a first probability distribution of frequencies of event types generated by a second event source of the pair of event sources; and
calculating an information divergence between the first probability distribution and the second probability distribution, the information divergence being a measure of the similarity between the pair of event sources.

14. The system of claim 9, where calculating the similarity for each pair of event sources comprises:
calculating a first probability distribution of the frequencies of event types generated by a first event source of the pair of event sources;
calculating a first probability distribution of frequencies of event types generated by a second event source of the pair of event sources; and
calculating a Jensen-Shannon divergence between the first probability distribution and the second probability distribution, the Jensen-Shannon divergence being a measure of the similarity between the pair of event sources.

15. The system of claim 9, wherein determining the event source clusters comprises:
applying hierarchical clustering analysis to the similarities of event sources in order to generate a dendrogram of the event source similarities; and
forming the event source clusters for event sources connected by similarities that are greater than a dissimilarity threshold.

16. The system of claim 9, wherein determining the local outlier factor for each event source of each the event source cluster comprises:
calculating a distance between each pair of the event sources in the event source cluster;
calculating a k-th nearest neighbor distance for event source of the event source cluster;
determining a k-distance neighborhood for each event source of the event source cluster based on the k-th nearest neighbor distance of each event source;
calculating a local reachability density for each event source based on the k-distance neighborhood of each event source;
calculating a local outlier factor for each event source based on the local reachability density of event sources within the k-distance neighborhood; and identifying an event source in the event source cluster as an event source outlier when the local outlier factor of the event source is greater than the local outlier factor threshold.

17. A non-transitory computer-readable medium encoded with machine-readable instructions that implement a method carried out by one or more processors of a computer system to perform the operations of collecting event messages generated by event sources within an observation time window, the event sources hosted by a number of the components of the distributed computing system;

determining frequencies of event types of the event messages within the observation time window;

calculating a similarity for each pair of event sources based on the frequencies of the event types;

determining event source clusters based on the similarities determined for each pair of event sources;

determining a local outlier factor for each event source of each event source cluster;

identifying anomalously behaving components of the set of components that host the event sources when a corresponding local outlier factor is greater than a local outlier factor threshold; and migrating virtual machines from one or more server computers having the anomalously behaving components to one or more server computers having normal behaving components.

18. The medium of claim 17, wherein the event sources are copies of the same type of event source running on the components.

19. The medium of claim 17, wherein determining frequencies of event types within the observation time window comprises for each event log generated by one of the event sources, determining an event type of each event message recorded within the observation time window using event type analysis; and counting a number of times each event type occurs within the observation time window, the number of each event type being the frequency of the event type.

20. The medium of claim 17, wherein calculating the similarity for each pair of event sources comprises:

identifying frequencies of event types of a first event source of the pair of event sources as a first event-type frequency vector;

identifying frequencies of event types of a second event source of the pair of event sources as a second event-type frequency vector; and calculating a similarity between the first and second event-type frequency vectors, the similarity being a measure of closeness between the pair of event sources.

21. The medium of claim 17, where calculating the similarity for each pair of event sources comprises:

calculating a first probability distribution of the frequencies of event types generated by a first event source of the pair of event sources;

calculating a first probability distribution of frequencies of event types generated by a second event source of the pair of event sources; and calculating an information divergence between the first probability distribution and the second probability distribution, the information divergence being a measure of the similarity between the pair of event sources.

22. The medium of claim 17, where calculating the similarity for each pair of event sources comprises:

calculating a first probability distribution of the frequencies of event types generated by a first event source of the pair of event sources;

calculating a first probability distribution of frequencies of event types generated by a second event source of the pair of event sources; and calculating a Jensen-Shannon divergence between the first probability distribution and the second probability distribution, the Jensen-Shannon divergence being a measure of the similarity between the pair of event sources.

23. The medium of claim 17, wherein determining the event source clusters comprises:

applying hierarchical clustering analysis to the similarities of event sources in order to generate a dendrogram of the event source similarities; and forming the event source clusters for event sources connected by similarities that are greater than a dissimilarity threshold.

24. The medium of claim 17, wherein determining the local outlier factor for each event source of each the event source cluster comprises:

calculating a distance between each pair of the event sources in the event source cluster;

calculating a k-th nearest neighbor distance for event source of the event source cluster;

determining a k-distance neighborhood for each event source of the event source cluster based on the k-th nearest neighbor distance of each event source;

calculating a local reachability density for each event source based on the k-distance neighborhood of each event source;

calculating a local outlier factor for each event source based on the local reachability density of event sources within the k-distance neighborhood; and identifying an event source in the event source cluster as an event source outlier when the local outlier factor of the event source is greater than the local outlier factor threshold.

* * * * *